(12) United States Patent
Fugitt et al.

(10) Patent No.: US 10,858,784 B2
(45) Date of Patent: Dec. 8, 2020

(54) COATINGS USING CLAYS WITH LOW PACKING DENSITY

(71) Applicant: WestRock MWV, LLC, Atlanta, GA (US)

(72) Inventors: Gary P. Fugitt, Rockville, VA (US); Steven G. Bushhouse, Ouinton, VA (US); Scott E. Ginther, Moseley, VA (US)

(73) Assignee: WestRock MWV, LLC, Atlanta, GA (US)

( * ) Notice: Subject to any disclaimer, the term of this patent is extended or adjusted under 35 U.S.C. 154(b) by 48 days.

(21) Appl. No.: 16/228,983

(22) Filed: Dec. 21, 2018

(65) Prior Publication Data

US 2019/0211506 A1    Jul. 11, 2019

Related U.S. Application Data

(60) Provisional application No. 62/616,094, filed on Jan. 11, 2018.

(51) Int. Cl.

| | |
|---|---|
| *D21H 19/40* | (2006.01) |
| *C09D 7/61* | (2018.01) |
| *C09D 7/40* | (2018.01) |
| *C09D 125/14* | (2006.01) |
| *C09D 133/06* | (2006.01) |
| *D21H 19/38* | (2006.01) |
| *D21H 19/58* | (2006.01) |
| *D21H 19/60* | (2006.01) |
| *D21H 19/82* | (2006.01) |
| *C09D 5/00* | (2006.01) |

(52) U.S. Cl.
CPC ............... *D21H 19/40* (2013.01); *C09D 5/00* (2013.01); *C09D 7/61* (2018.01); *C09D 7/69* (2018.01); *C09D 125/14* (2013.01); *C09D 133/062* (2013.01); *D21H 19/385* (2013.01); *D21H 19/58* (2013.01); *D21H 19/60* (2013.01); *D21H 19/822* (2013.01)

(58) Field of Classification Search
None
See application file for complete search history.

(56) References Cited

U.S. PATENT DOCUMENTS

| | | | |
|---|---|---|---|
| 5,763,100 A * | 6/1998 | Quick | ................... B65D 65/42 428/486 |
| 6,758,895 B2 | 7/2004 | Robin | |
| 6,814,796 B2 | 11/2004 | Husband | |
| 7,153,356 B1 | 12/2006 | Harris et al. | |
| 7,208,039 B2 | 4/2007 | Philip | |
| 7,214,264 B2 | 5/2007 | Philip | |
| 8,142,887 B2 | 3/2012 | Fugitt | |
| 2005/0126730 A1 | 6/2005 | Lorusso | |

(Continued)

FOREIGN PATENT DOCUMENTS

| | | |
|---|---|---|
| WO | WO2006/076012 A2 | 7/2006 |
| WO | WO2011100029 A1 | 8/2011 |
| WO | WO2012006199 A1 | 1/2012 |

*Primary Examiner* — Dennis R Cordray
(74) *Attorney, Agent, or Firm* — Walters & Wasylyna LLC

(57) ABSTRACT

Paper and paperboard coatings are disclosed using a modified clay which is characterized by an average shape factor less than 60, a sediment void volume greater than 48%, and containing less than 30% by mass of particles less than 1 micron in diameter.

20 Claims, 24 Drawing Sheets

(56) References Cited

U.S. PATENT DOCUMENTS

| | | |
|---|---|---|
| 2006/0124033 A1 | 6/2006 | Pruett |
| 2009/0236062 A1* | 9/2009 | Fugitt .................... D21H 19/38 |
| | | 162/109 |
| 2009/0239047 A1 | 9/2009 | Fugitt et al. |
| 2010/0266819 A1* | 10/2010 | Bushhouse ........... C09C 1/0081 |
| | | 428/173 |
| 2011/0086174 A1 | 4/2011 | Lee et al. |
| 2013/0192166 A1* | 8/2013 | Olsson ................... D21H 19/36 |
| | | 53/428 |
| 2015/0024094 A1* | 1/2015 | Keller ................... B65D 81/24 |
| | | 426/106 |
| 2016/0355687 A1 | 12/2016 | Hwang |

\* cited by examiner

Sheffield Smoothness for Standard and Modified Clays Applied to Uncoated Recycled Board

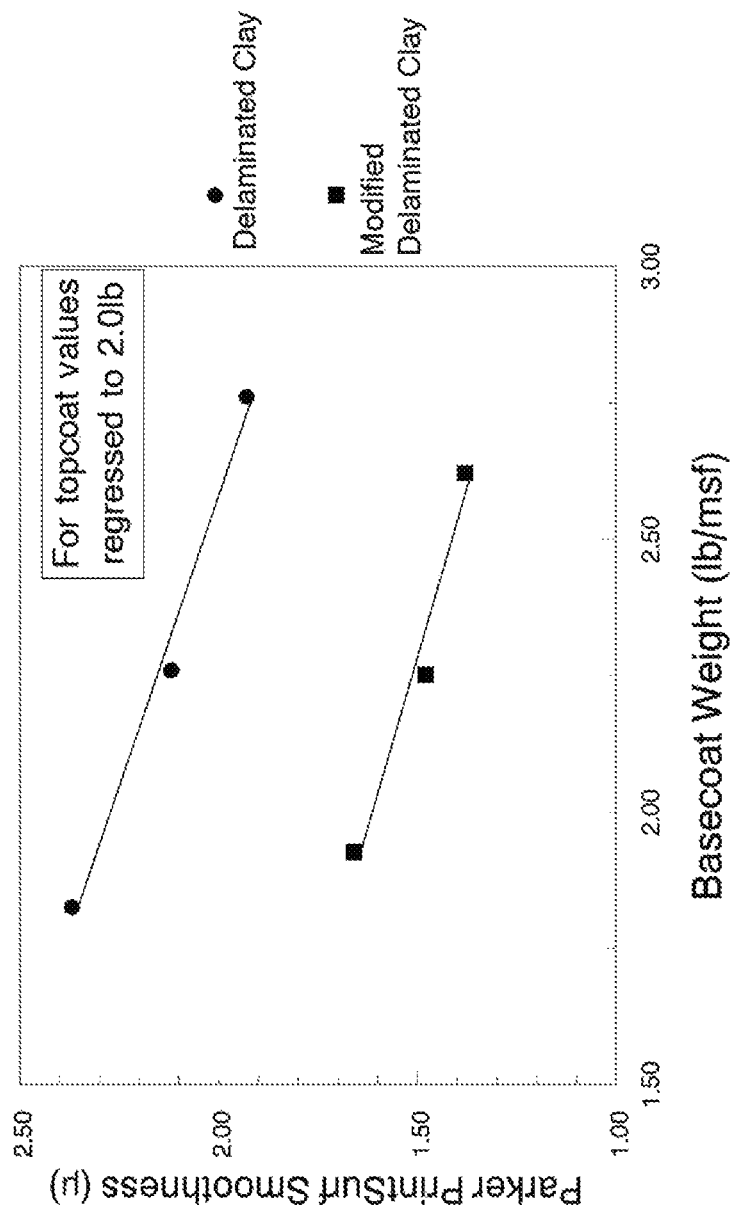

US 10,858,784 B2

COATINGS USING CLAYS WITH LOW PACKING DENSITY

PRIORITY

This application claims priority from U.S. Ser. No. 62/616,094 filed on Jan. 11, 2018, the entire contents of which are incorporated herein by reference.

FIELD

This patent application is directed to coatings for paper and paperboard incorporating clays that are modified to exhibit low packing density.

BACKGROUND

Pigments such as clay are used in many products including coatings and paints. In certain applications it is beneficial to use pigments that exhibit a low packing density or high bulk volume. Architectural, industrial and paperboard coatings, as well as paints, are often used to hide roughness or surface defects. Increasing the packing volume of a pigment increases the volume per weight of the coating or paint in which it is used. This results in greater coverage and better hiding performance. There are many examples of this. One example is U.S. Pat. No. 8,142,887 by Fugitt et al. describing a method to increase the packing volume of pigments in paperboard coatings using a high shape factor pigment. Kaolin clay (from this point referred to as "clay") is a common inexpensive pigment used in many industrial applications. Clay is a naturally occurring plate-like mineral that is mined from the ground, and processed to make a wide variety of products. All of these products are typified by a wide range of particle sizes and particle shapes.

SUMMARY

In one embodiment, the disclosed coating composition includes a kaolin pigment containing a low degree of fine particles as defined by less than 30% by mass of particles with less than one micron equivalent spherical diameter as measured by the Sedigraph particle size analyzer, and which has a low packing density as measured by a sediment void volume greater than 48%.

In further embodiments, a coated paperboard is disclosed in which the coating composition is applied to a paperboard substrate. The composition may be applied as a single coating or as a basecoat to which a topcoat is applied. A method of forming a coated paperboard is also disclosed.

BRIEF DESCRIPTION OF THE DRAWINGS

FIG. 24 is a graph of Sheffield smoothness vs. low coat weight of topcoats applied over the basecoats of FIG. 22 with topcoat values regressed to 2.0 lb, comparing modified clays to unmodified clays.

DETAILED DESCRIPTION

Pigment materials such as clays, including kaolin clays, may usually be characterized by a distribution of particle sizes. The particle size distribution often plays a significant role in determining the usefulness of a pigment for various applications. Broad particle size distributions may tend to pack more closely and provide a denser structure that may be advantageous in certain application. Narrower particle size distributions, or particles with plate-like shapes, may tend to pack more loosely and provide a less dense structure that may be advantageous in other applications.

Figure 1:
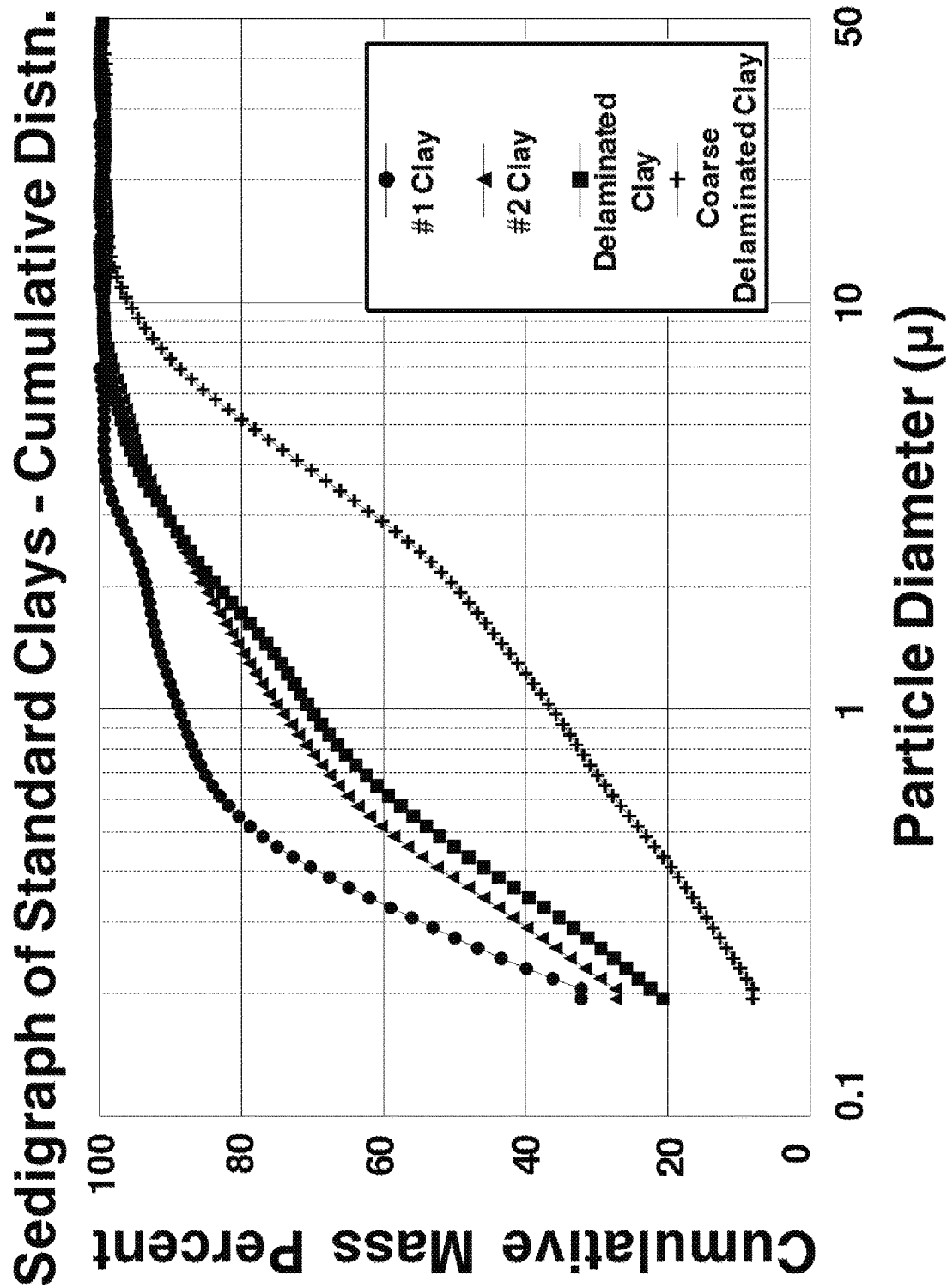
FIG. 1 is a graph for four standard clays showing cumulative mass percent vs. particle diameter recorded by a first measurement method (Sedigraph)

FIG. 1 provides a graphical representation of the cumulative mass distribution vs particle diameter for four commercially available kaolin clays. These particular clays were chosen to represent the breadth of clays available commercially, and are reported to have shape factors significantly less than 60 (shape factor will be further described below). Each of the four clays represents a class of clay that is available from multiple suppliers. One key distinction between these clays is the average particle size, measured as the diameter at 50% on the cumulative mass curve. All four pigments contain particles of similar sizes, but have average particles sizes ranging from about 0.25µ to 2µ due to different proportions of the sizes present. The clays were:

1 Clay (HYDRAFINE® from Kamin) #1 is a relatively fine clay, but still has larger particles. #1 clays generally have about 85% particles below 1 micron, and 95%<2 microns.

2 Clay (KAOBRITE® from Thiele) #2 clay is coarser and has about 75% particles<1 micron, and 85%<2 microns.

Delaminated Clay (ASTRA-PLATE® from Imerys)—Delaminated clays are reported to have a higher shape factor than standard clays. Roughly, they have a reported shape factor of about 30 while standard clays have a shape factor of about 15. Delaminated clays have size distributions similar to a #2 clay.

Coarse Delaminated clay (Nusurf from BASF)—This is a coarser pigment with a shape factor of about 30. It has about 35% particles<1 micron, and 50%<2 microns In this description, the four clays described above are termed "standard" clays, meaning that they have not been altered yet by the modification to be described below. As used herein, the "particle size" of a pigment refers to the distribution of equivalent spherical diameter of the pigment, which may be measured using a particle size analyzer regardless of whether the particles are spherical (or near spherical) or non-spherical. The cumulative size distribution data presented in FIG. 1 were collected using a SEDIGRAPH® 5120 particle size analyzer, which is commercially available from Micromeritics Instrument Corporation of Norcross, Ga. This instrument measures the particle size distribution based on settling rate (Stokes Law) and reports distribution as a cumulative mass percent finer than a given equivalent spherical diameter. For the first three clays, particles below 0.2 microns (the lower end of the data) make up from 20-40% of the clay; and for the last clay, about 10% of the clay. For the first three clays, there are essentially no particles above 8 microns, and for the coarse delaminated clay, essentially no particles above about 15 microns.

Figure 2:
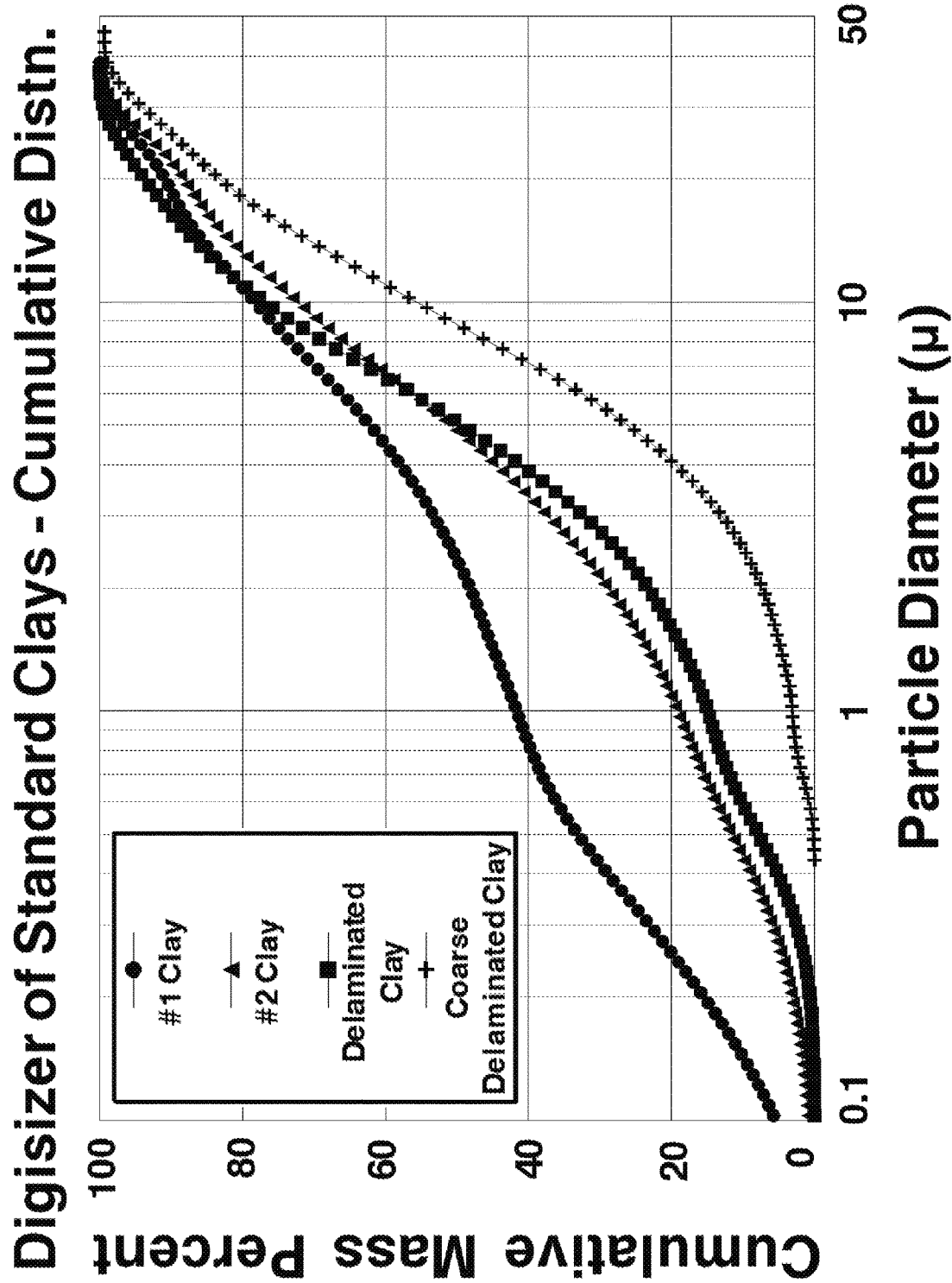
FIG. 2 is a graph for the same clays showing cumulative mass percent vs. particle diameter recorded by a second measurement method (Digisizer)

Another method of measuring particle diameter was used to generate the data in FIG. 2, taken by a DIGISIZER Instrument made by Micromeritics. This method measures the occluded area of particles using a laser light scattering technique. This method is not dependent on settling rate although somewhat similar results may be obtained. The Digisizer (FIG. 2) light scattering results indicate generally larger particles than shown by the Sedigraph (FIG. 1) particle settling data.

Figure 3:
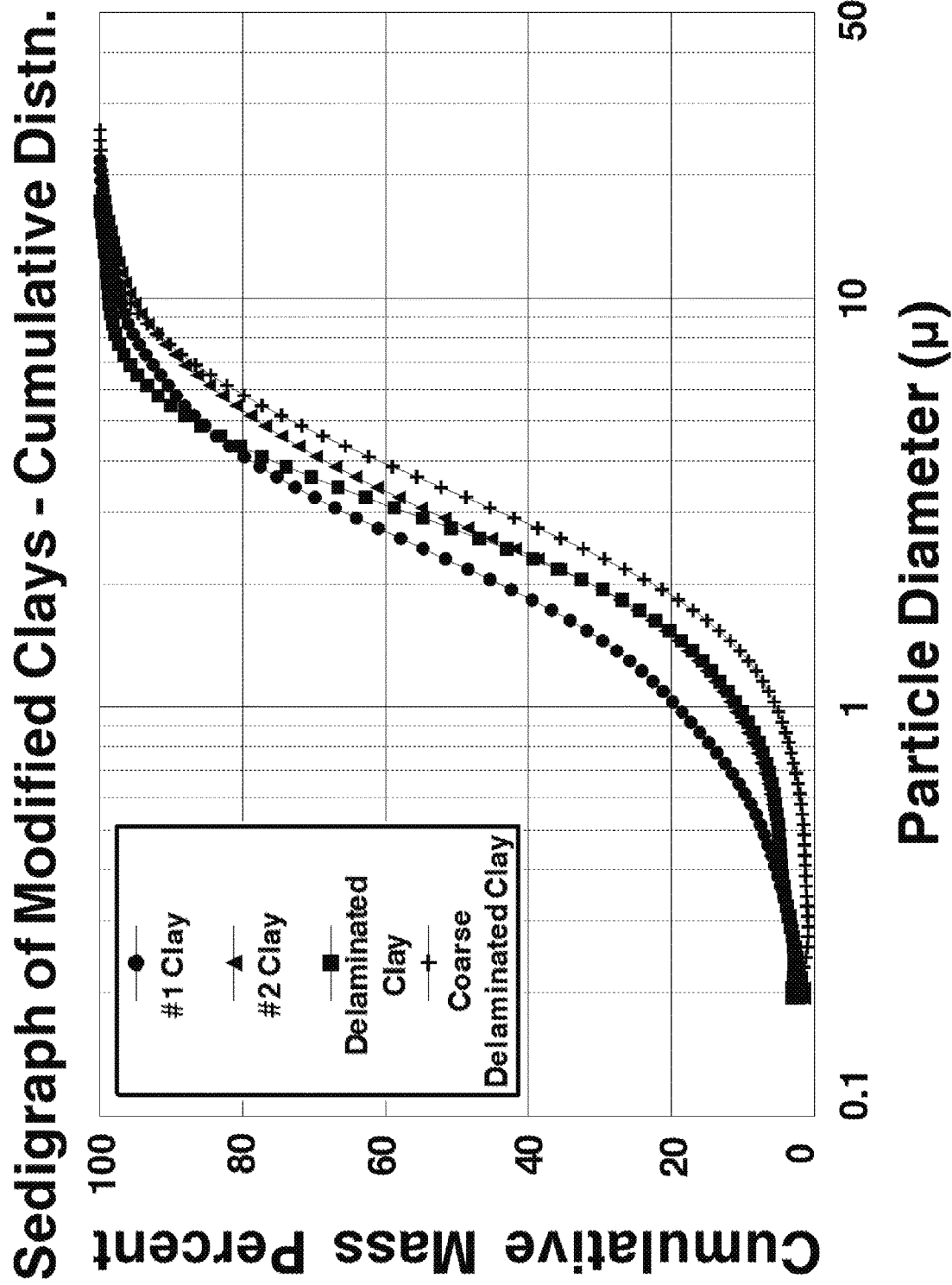
FIG. 3 is a graph for the clays after modification, showing cumulative mass percent vs. particle diameter recorded by the first measurement method.
Figure 4:
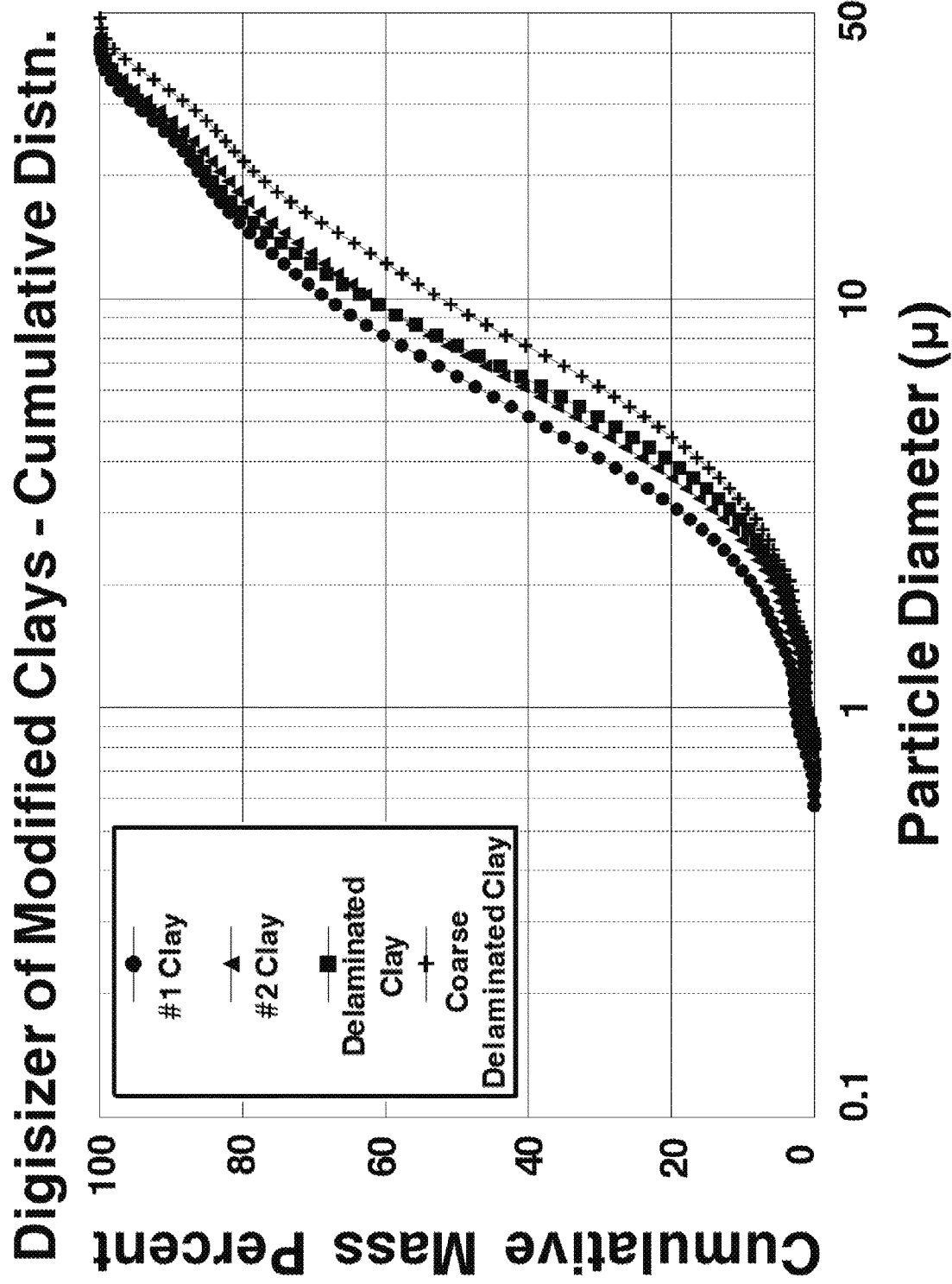
FIG. 4 is a graph for the clays after modification, showing cumulative mass percent vs. particle diameter recorded by the second measurement method.

These standard clays are commercial clays, and have therefore already experienced refinement and processing. One common step in refining crude clays into the commercial products is centrifugal separation. Centrifugation greatly increases gravity effects to segregate particles based on size. This process is often used to make multiple products using the same crude clay source. The clays were next 'modified' using a lab technique that also uses gravity forces to separate particles by size. Instead of dynamic centrifugation, we used a static process. The clays were diluted in water to 10% solids by weight and allowed to settle for 24 hours. After 24 hours, the liquid portion was poured off leaving a sediment in the bottom of the container. This sediment contained the coarse portion of the size distribution, while the finest particles remained suspended in the liquid. The sediment was re-suspended and dispersed and will be described herein as a modified clay. Each of the four 'standard' clays listed above was modified using this method, and the cumulative particle size distributions are shown in FIG. 3 (Sedigraph method) and FIG. 4 (Digisizer method). The cumulative particle size distributions in FIGS. 3 and 4 show somewhat S-shaped curves (especially FIG. 3) as are characteristic of a fairly unimodal distribution. The percentage of particles below 1 micron is greatly reduced, these fine particles having been removed in the supernatant from the settling step.

Figure 5:
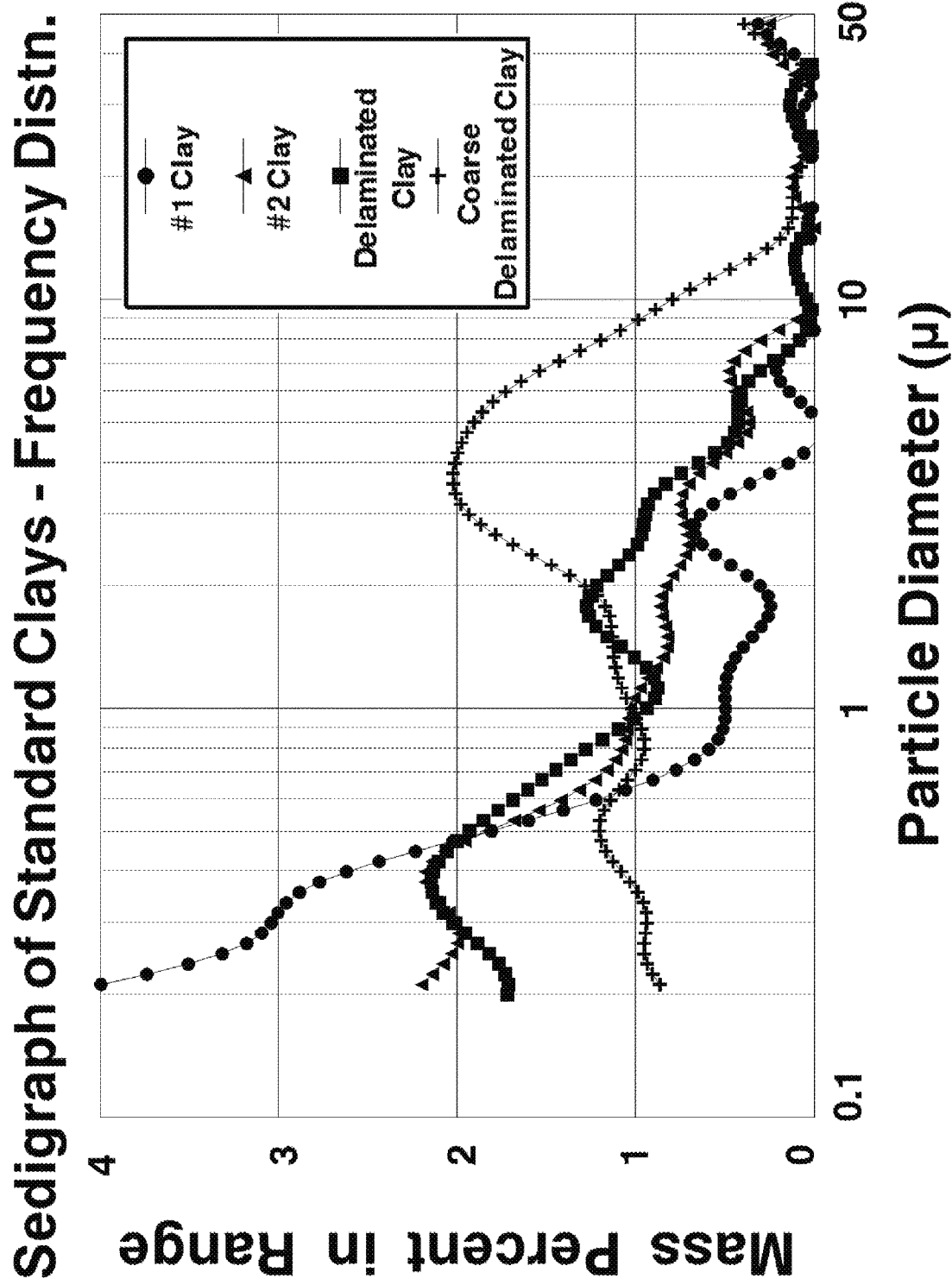
FIG. 5 is a graph for the standard clays showing frequency distribution of particle diameter recorded by the first measurement method (Sedigraph)
Figure 6:
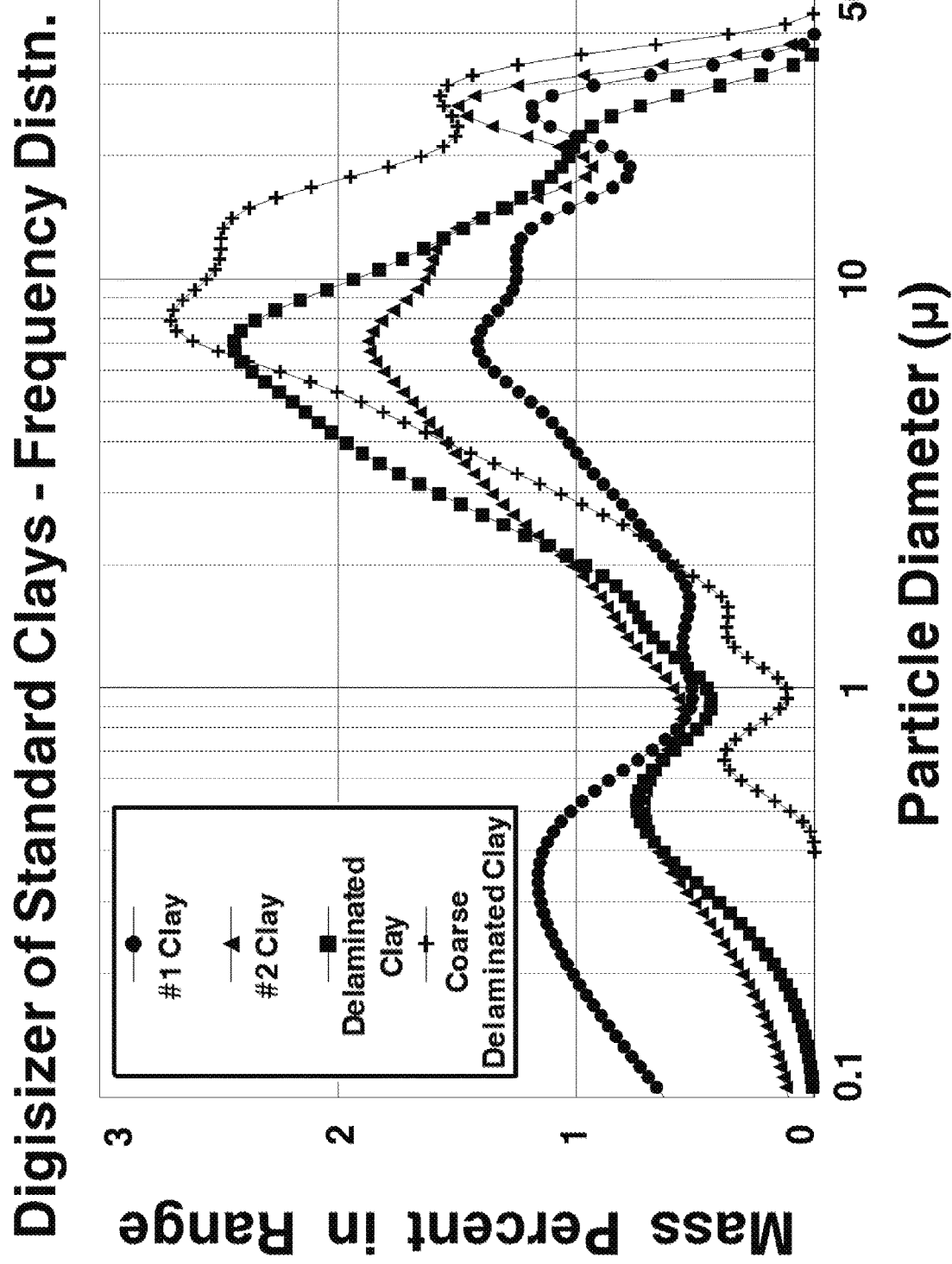
FIG. 6 is a graph for the standard clays showing frequency distribution vs. particle diameter recorded by the second measurement method (Digisizer)
Figure 7:
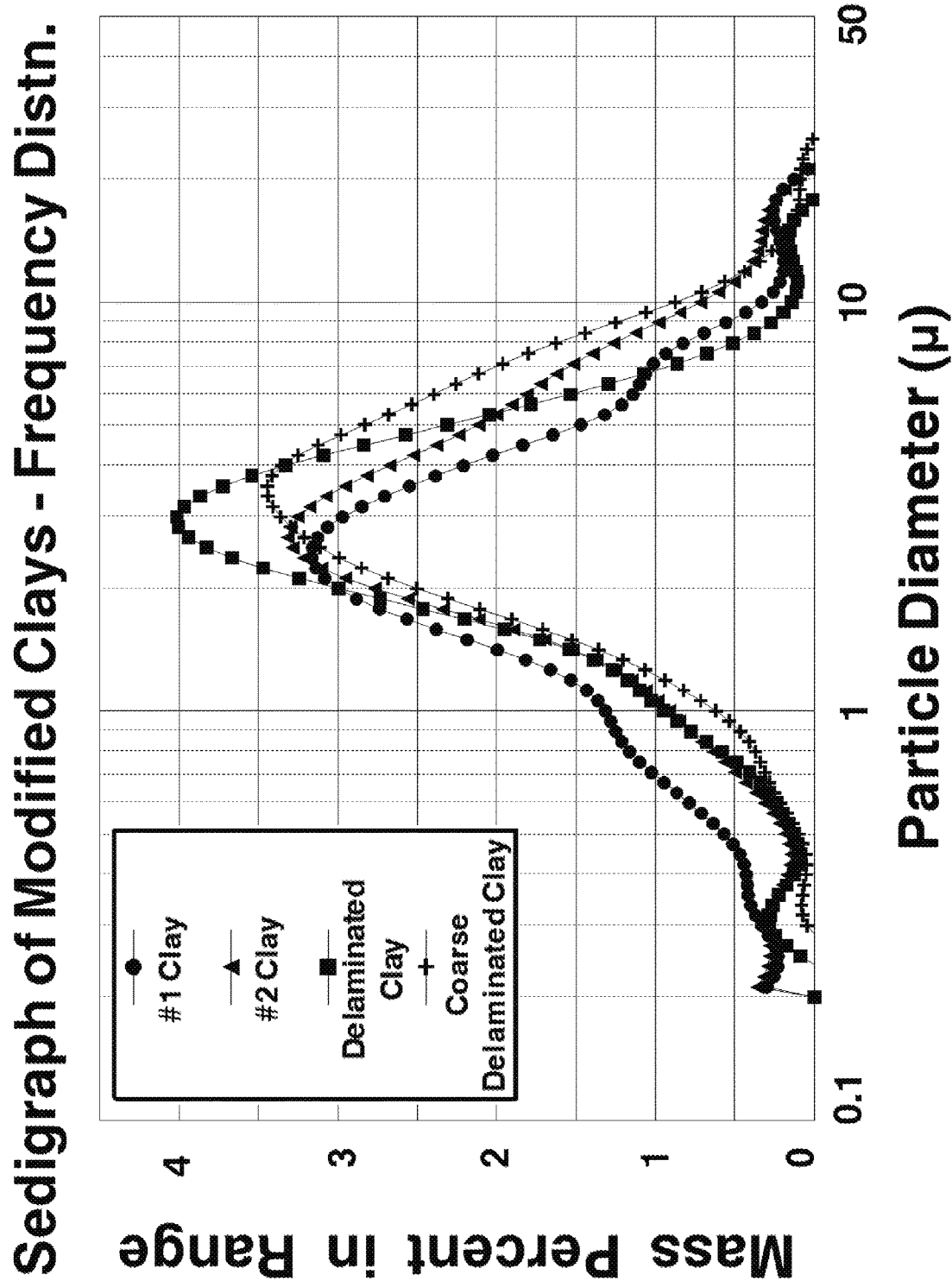
FIG. 7 is a graph for the modified clays showing frequency distribution vs. particle diameter recorded by the first measurement method.
Figure 8:
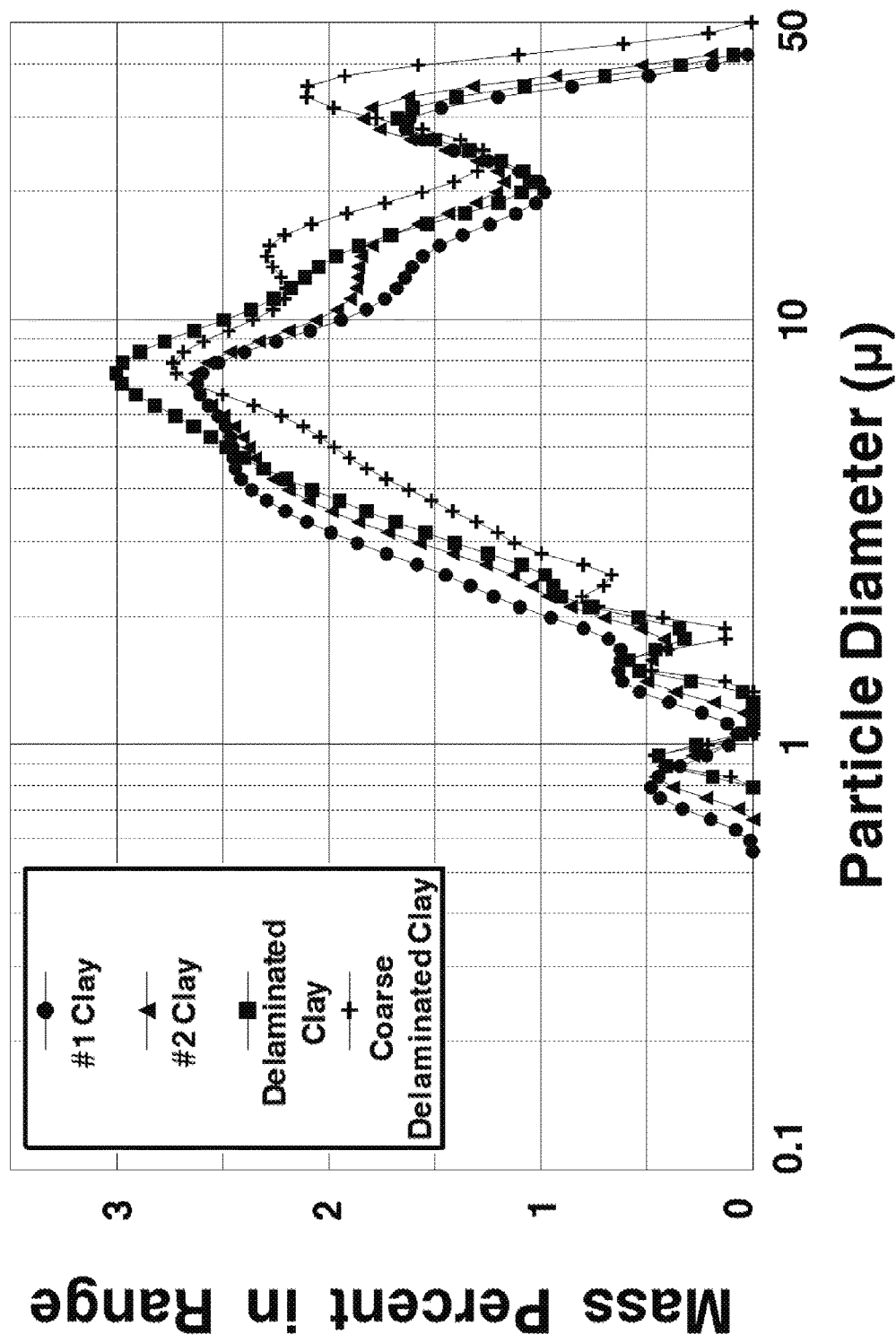
FIG. 8 is a graph for the modified clays showing cumulative mass percent vs. particle diameter recorded by the second measurement method.

The cumulative particle size distributions in FIGS. 1-4 may be compared with corresponding frequency distributions in FIGS. 5-8. The 'standard' clays as seen in FIGS. 5-6 generally have multimodal distributions, while the 'modified' clays as seen in FIGS. 7-8 have more uniform distributions, especially in FIG. 7 where the Sedigraph data for each of the four modified clays exhibit a unimodal and nearly normal (Gaussian) frequency distribution. Commercial clays are intentionally made with broad particle size distributions because this gives them good fluid flow properties and lower viscosity.

The original and the modified versions of the clays from example 1 were tested for packing density as measured by sediment void volume. Sediment void volume is reported as sediment void volume percentage and is measured as follows: The clay is diluted with water to 50% by weight solids. A 70 g sample of the resulting slurry is centrifuged at 8000 g for 90 minutes using a Fisher Scientific accuSpin 400 centrifuge. The supernatant water is poured off and weighed, from which the weight of water held by voids within the sediment is known. The weight of the clay is also known. From the density of water and the clay particle density, the percent volume of the voids can be calculated.

In an expression, the sediment void volume is measured using the following steps: (1) dispersing the clay in water to form a slurry at 50% by weight solids; (2) centrifuging a 70 g sample of the slurry at 8000 g for 90 minutes; (3) pouring the supernatant water off the settled clay and weighing the supernatant water X; (4) determining the weight of remaining water in the settled clay as Y=70/2−X (g); (5) determining the volume of the remaining water as $V_w$=Y/1 g/cc; (6) determining the volume of the clay $V_c$ as 70/2/Z, where Z is a known density of the clay in g/cc; and (7) determining the void volume percent as $V_w/(V_w+V_c)*100\%$.

Figure 9:
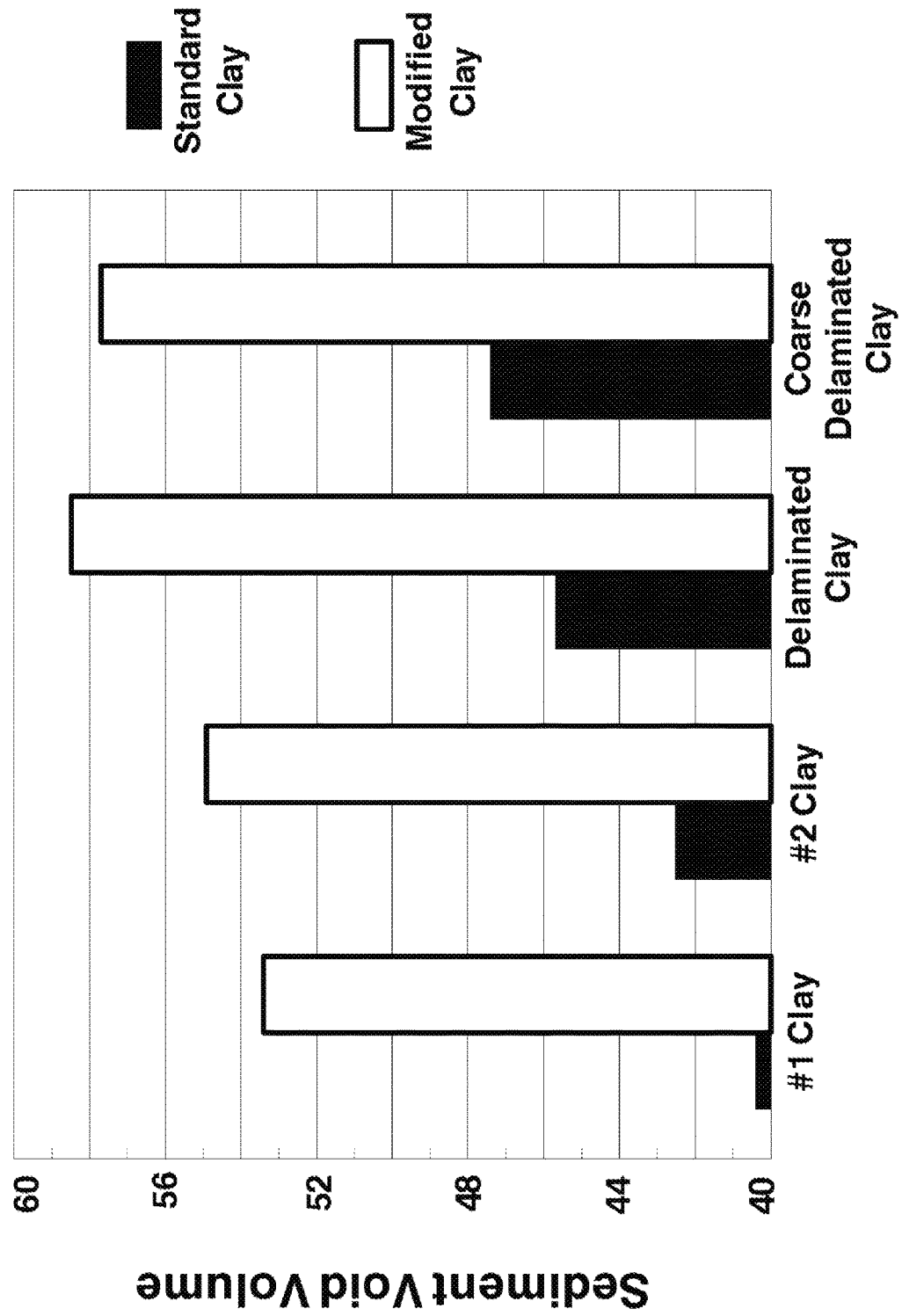
FIG. 9 is a bar chart comparing sediment void volumes of the four standard clays and their modified counterparts.

FIG. 9 is a bar chart that shows the marked increase of sediment void volume for the modified clays. The sediment void volume of the standard clays ranges from about 40 to 47%, while the sediment void volume of the modified clays is significantly greater and ranges from 51 to 57%.

Figure 10:
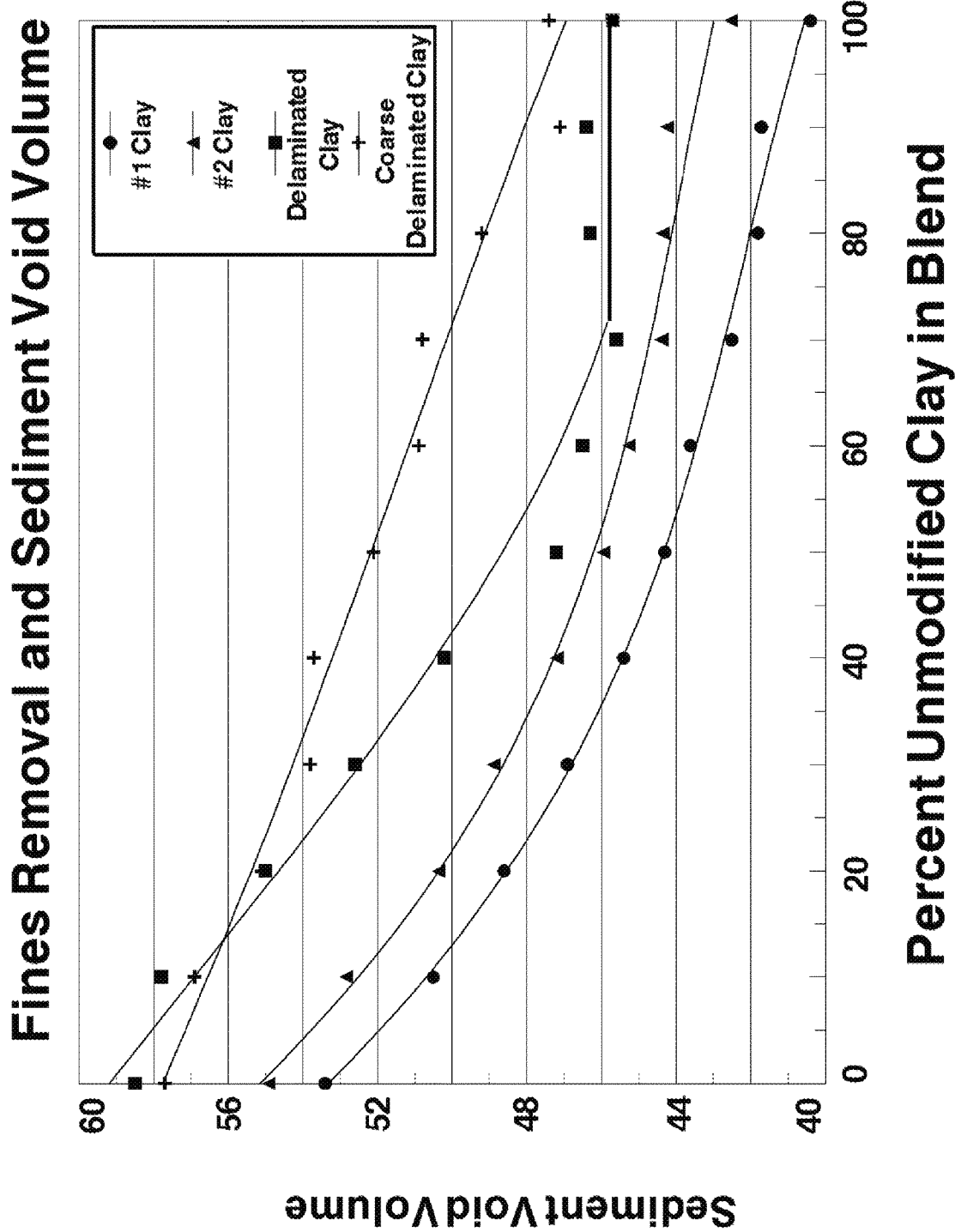
FIG. 10 is a graph for the four clays, showing sediment void volume vs. amount of standard clay.

FIG. 10 shows sediment void volumes for mixtures of each standard clay with its respective modified clay, ranging from the left side of the graph (all modified clay=no standard clay) to the right side of the graph (all standard clay=no modified clay). This simulates the sequential removal of fines from the standard clay. The sediment void volume is a somewhat smooth and monotonic function of the modified clay percent in the mixture.

Figure 11:
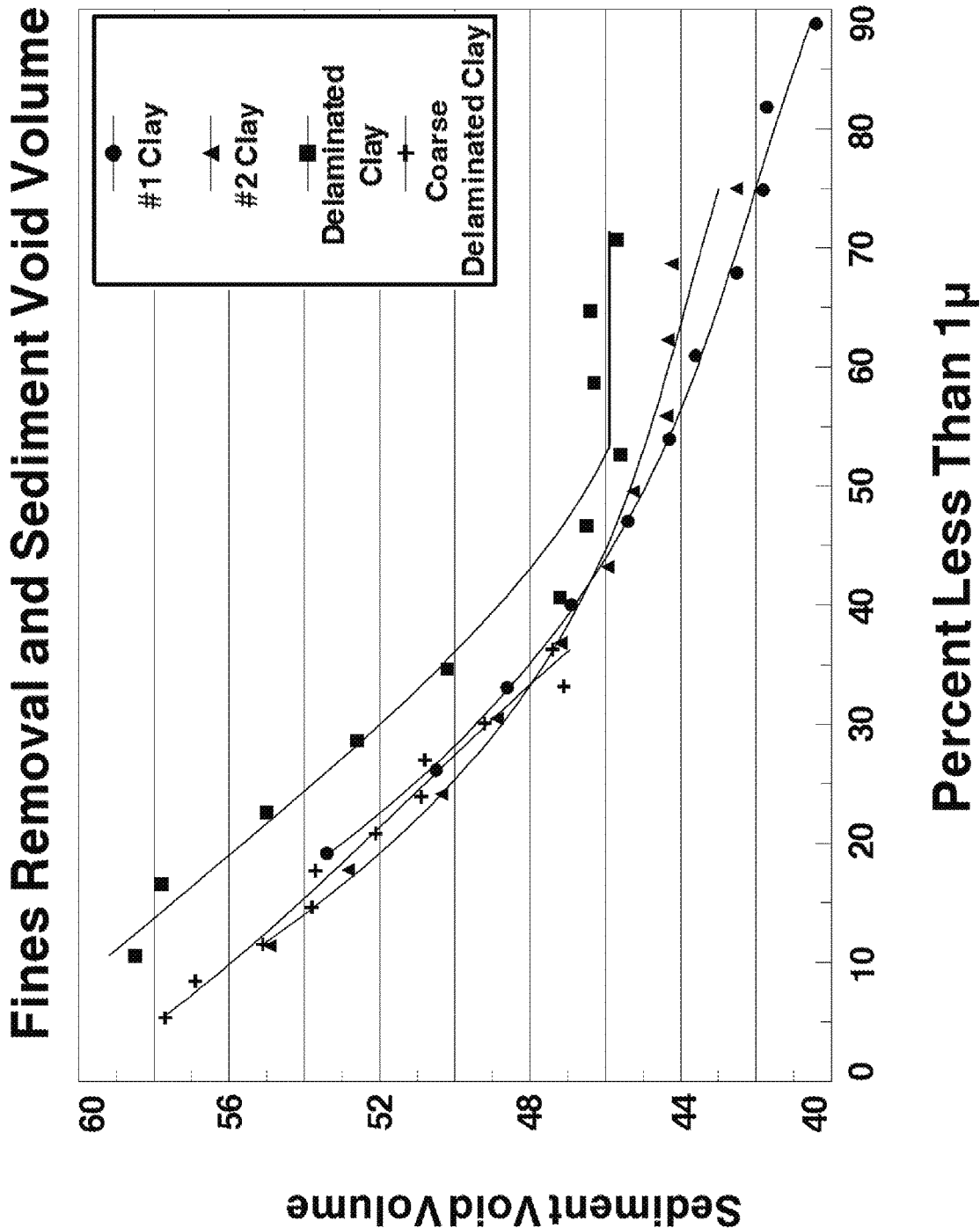
FIG. 11 is a graph for the four clays, showing sediment void volume vs. amount of particles below one micron diameter.

In FIG. 11, the data of FIG. 10 is replotted with a different x axis, namely, the percent of the clay weight corresponding to particles of less than 1 micron diameter. This shows the clear relationship between the level of fine particles and pigment packing. The fewer small particles in the clay, the higher the sediment void volume. This figure also shows that the performance of the four pigments is very similar even though they differ in terms of average particle size and size distributions.

Figure 12:
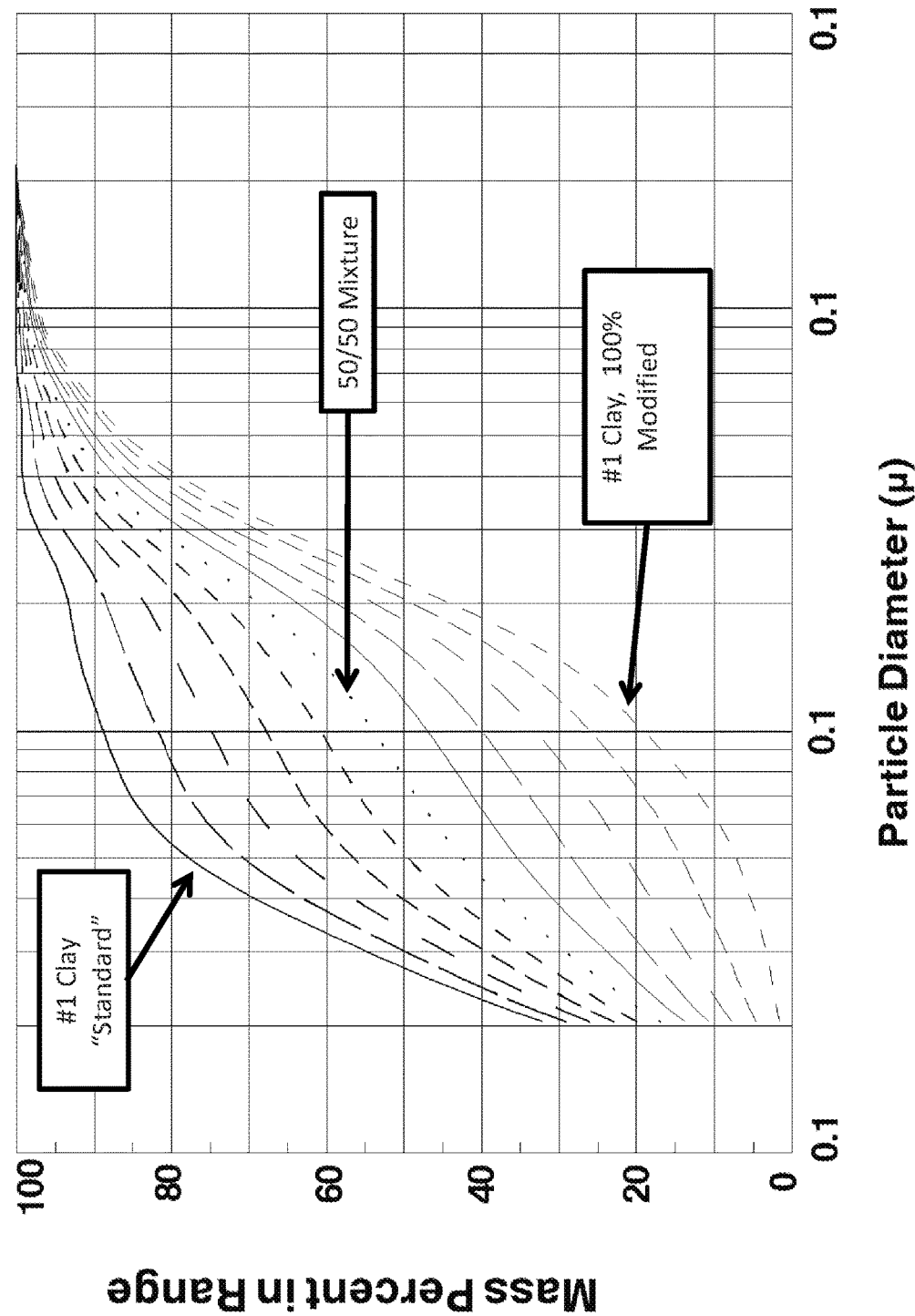
FIG. 12 is a graph for a particular one of the four clays, showing cumulative mass percent vs. particle diameter, for mixtures of the standard and modified versions of the particular clay.

FIG. 12 is an example of the particle size distributions resulting from the blends shown in FIGS. 10 and 11. It shows calculated Sedigraph data of cumulative particle size distributions for various mixtures of the #1 clay standard and modified versions. These distributions were calculated by proportionally averaging the distribution values from standard and modified #1 clay measurements. The data for the standard clay was taken from FIG. 1, and the data for the modified clay was taken from FIG. 3. Similar curves were generated for the #2, delaminated and coarse delaminated clays.

Figure 13:
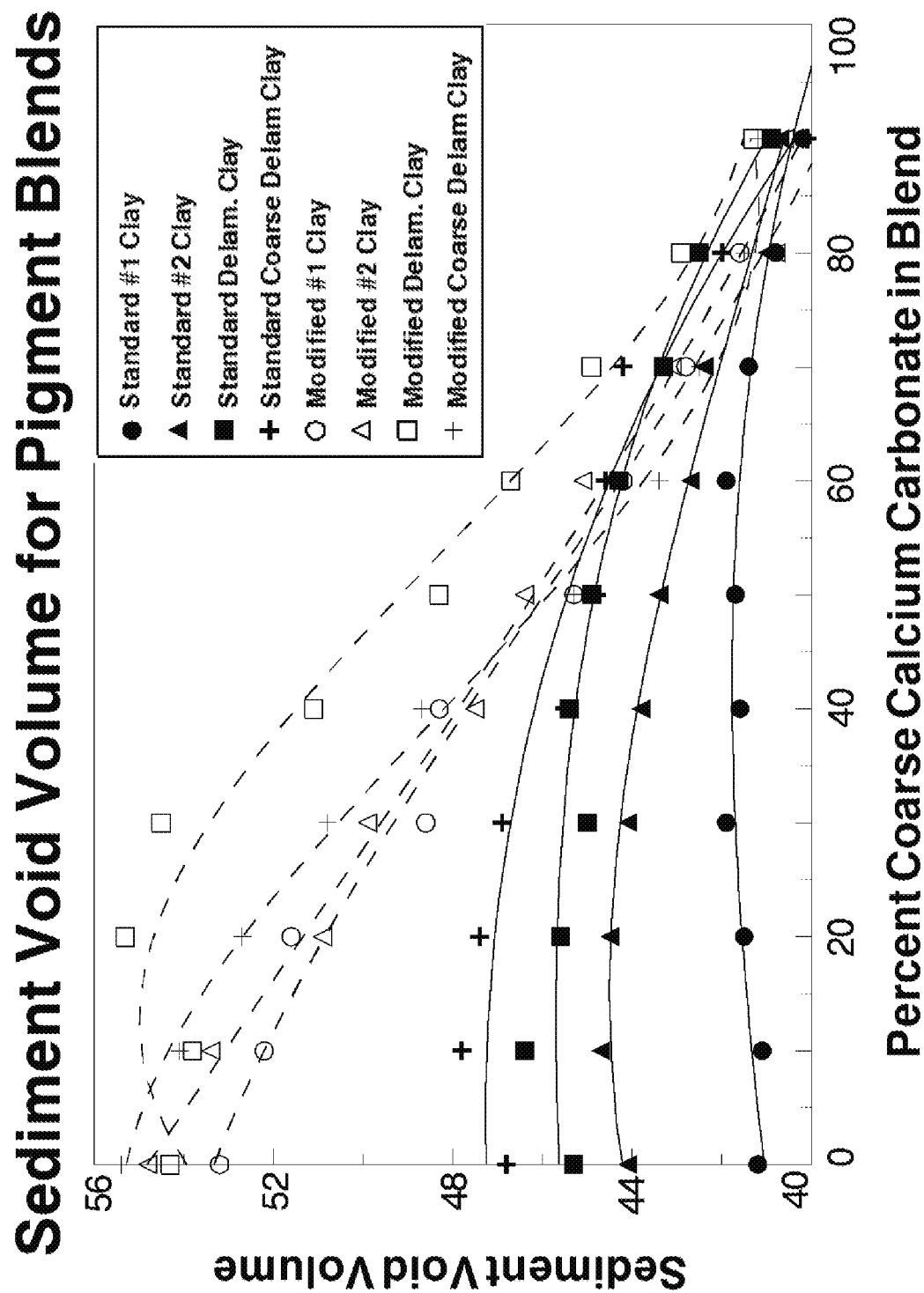
FIG. 13 is a graph of sediment void volume for blends of the standard and modified clays with varying amounts of coarse calcium carbonate.

Modified clay can be used in conjunction with other pigments. Both the standard and modified clays were blended with HYDROCARB® 60, a coarse ground calcium carbonate from Omya. FIG. 13 shows the sediment void volume of the blends. The curves clearly show that the modified clays give higher sediment void volume than the standard clays, even when blended with ground calcium carbonate. The maximum difference between standard and modified clays are shown for carbonate levels of 20-30%, but clear differences are seen for carbonate levels as high 60% carbonate.

Another way that clays are characterized is by their shape factor. Clays have a plate-like shape. The shape factor is ratio of plate diameter to plate thickness. There are several ways to characterize the shape factor. The method used here is published by Pabst et al. (Part. Part. Syst. Charact. 24 (2007) 458-463). It may be useful to characterize the modified clays with a single number, such as a shape factor value. Diameter values from Sedigraph ($D_S$) and Digisizer ($D_D$) are used to calculate a shape factor or aspect ratio, as outlined in Pabst et al.

$$\text{Shape factor} = 3/2\pi (D_D/D_S)^2$$

The calculation requires a specific diameter value from each measurement method. There being many different sized particles in any of the clays here, choosing representative particle sizes from the standard clay multimodal particle size distributions seems arbitrary. Furthermore, the shape factor is recognized as varying throughout the size range of any given clay. However, the generally unimodal data of the modified clays provides a logical single-point representative diameter. For example, the Sedigraph and Digisizer data may be matched at the median (midpoint) diameter of the cumulative distribution, or at the mode (highest) diameter of the frequency distributions.

The results based on median and modal diameter are shown in the first two columns of data in Table 1. Either of these methods can be considered valid, but as the table shows, the two methods may give quite different values.

TABLE 1

Shape Factors of Modified Clays

| | Shape Factor from Median Diameter | Shape Factor from Modal Diameter | Avg Shape Factor from Tables 2-5 |
|---|---|---|---|
| #1 Clay | 41.8 | 39.5 | 53.7 |
| #2 Clay | 33.2 | 33.3 | 33.7 |
| Delaminated Clay | 29.5 | 38.2 | 43.2 |
| Coarse Delaminated Clay | 23.5 | 38.4 | 33.5 |

TABLE 2

Calculated shape factor for (modified) #1 clay

| Cumulative Percent | Sedigraph Diameter | Digisizer Diameter | Shape Factor |
|---|---|---|---|
| 5 | 0.27 | 1.41 | 133.4 |
| 10 | 0.49 | 2.04 | 81.1 |
| 15 | 0.69 | 2.53 | 63.8 |
| 20 | 0.88 | 2.97 | 53.7 |
| 25 | 1.08 | 3.39 | 46.9 |
| 30 | 1.27 | 3.83 | 42.5 |
| 35 | 1.47 | 4.28 | 40.0 |
| 40 | 1.66 | 4.77 | 38.9 |
| 45 | 1.85 | 5.31 | 38.8 |
| 50 | 2.04 | 5.89 | 39.2 |
| 55 | 2.25 | 6.54 | 39.8 |
| 60 | 2.47 | 7.26 | 40.7 |
| 65 | 2.72 | 8.10 | 41.8 |
| 70 | 3.01 | 9.12 | 43.3 |
| 75 | 3.36 | 10.46 | 45.7 |
| 80 | 3.80 | 12.27 | 49.0 |
| 85 | 4.40 | 14.89 | 53.9 |
| 90 | 5.26 | 19.26 | 63.2 |
| 95 | 6.68 | 24.80 | 64.8 |
| Average Shape Factor | | | 53.7 |

TABLE 3

Calculated shape factor for (modified) #2 clay

| Cumulative Percent | Sedigraph Diameter | Digisizer Diameter | Shape Factor |
|---|---|---|---|
| 5 | 0.35 | 1.38 | 75.1 |
| 10 | 0.73 | 2.08 | 38.0 |
| 15 | 1.03 | 2.61 | 30.0 |
| 20 | 1.30 | 3.08 | 26.4 |
| 25 | 1.54 | 3.53 | 24.7 |
| 30 | 1.73 | 4.00 | 25.0 |
| 35 | 1.94 | 4.49 | 25.1 |
| 40 | 2.18 | 5.02 | 25.1 |
| 45 | 2.31 | 5.60 | 27.6 |
| 50 | 2.59 | 6.23 | 27.3 |
| 55 | 2.75 | 6.93 | 30.0 |
| 60 | 3.08 | 7.73 | 29.7 |
| 65 | 3.45 | 8.68 | 29.9 |
| 70 | 3.66 | 9.88 | 34.3 |
| 75 | 4.10 | 11.39 | 36.3 |
| 80 | 4.87 | 13.30 | 35.1 |
| 85 | 5.47 | 15.96 | 40.1 |
| 90 | 6.88 | 20.54 | 42.0 |
| 95 | 9.17 | 26.12 | 38.2 |
| Average Shape Factor | | | 33.7 |

TABLE 4

Calculated shape factor for (modified) delaminated clay

| Cumulative Percent | Sedigraph Diameter | Digisizer Diameter | Shape Factor |
|---|---|---|---|
| 5 | 0.75 | 1.86 | 29.0 |
| 10 | 1.10 | 2.62 | 26.9 |
| 15 | 1.36 | 3.22 | 26.6 |
| 20 | 1.58 | 3.77 | 26.9 |
| 25 | 1.77 | 4.32 | 27.9 |
| 30 | 1.96 | 4.88 | 29.2 |
| 35 | 2.14 | 5.47 | 30.8 |
| 40 | 2.32 | 6.09 | 32.4 |
| 45 | 2.51 | 6.74 | 33.9 |
| 50 | 2.71 | 7.42 | 35.3 |
| 55 | 2.92 | 8.18 | 36.9 |
| 60 | 3.15 | 9.08 | 39.2 |
| 65 | 3.40 | 10.21 | 42.5 |
| 70 | 3.68 | 11.62 | 46.9 |
| 75 | 4.01 | 13.32 | 51.9 |
| 80 | 4.41 | 15.41 | 57.4 |
| 85 | 4.92 | 18.70 | 68.0 |
| 90 | 5.64 | 24.39 | 88.2 |
| 95 | 6.79 | 29.69 | 90.1 |
| Average Shape Factor | | | 43.2 |

TABLE 5

Calculated shape factor for (modified) coarse delaminated clay

| Cumulative Percent | Sedigraph Diameter | Digisizer Diameter | Shape Factor |
|---|---|---|---|
| 5 | 0.98 | 2.05 | 20.6 |
| 10 | 1.26 | 2.88 | 24.5 |
| 15 | 1.50 | 3.58 | 26.9 |
| 20 | 1.72 | 4.26 | 28.7 |
| 25 | 1.95 | 4.92 | 30.1 |
| 30 | 2.18 | 5.62 | 31.2 |
| 35 | 2.43 | 6.33 | 32.0 |
| 40 | 2.69 | 7.04 | 32.4 |
| 45 | 2.96 | 7.79 | 32.6 |
| 50 | 3.25 | 8.60 | 32.9 |
| 55 | 3.57 | 9.52 | 33.5 |
| 60 | 3.91 | 10.58 | 34.5 |
| 65 | 4.29 | 11.80 | 35.5 |
| 70 | 4.73 | 13.18 | 36.5 |
| 75 | 5.25 | 14.76 | 37.3 |
| 80 | 5.87 | 16.72 | 38.1 |
| 85 | 6.69 | 19.45 | 39.9 |
| 90 | 7.85 | 23.90 | 43.6 |
| 95 | 9.97 | 31.20 | 46.1 |
| Average Shape Factor | | | 33.5 |

The shape factor values for the modified #1 and #2 clays are larger than the value of 15 that is generally accepted for these materials. However, all are well below the value of 70 which is typically viewed as the lower threshold shape factor of hyperplaty clays.

Figure 14:
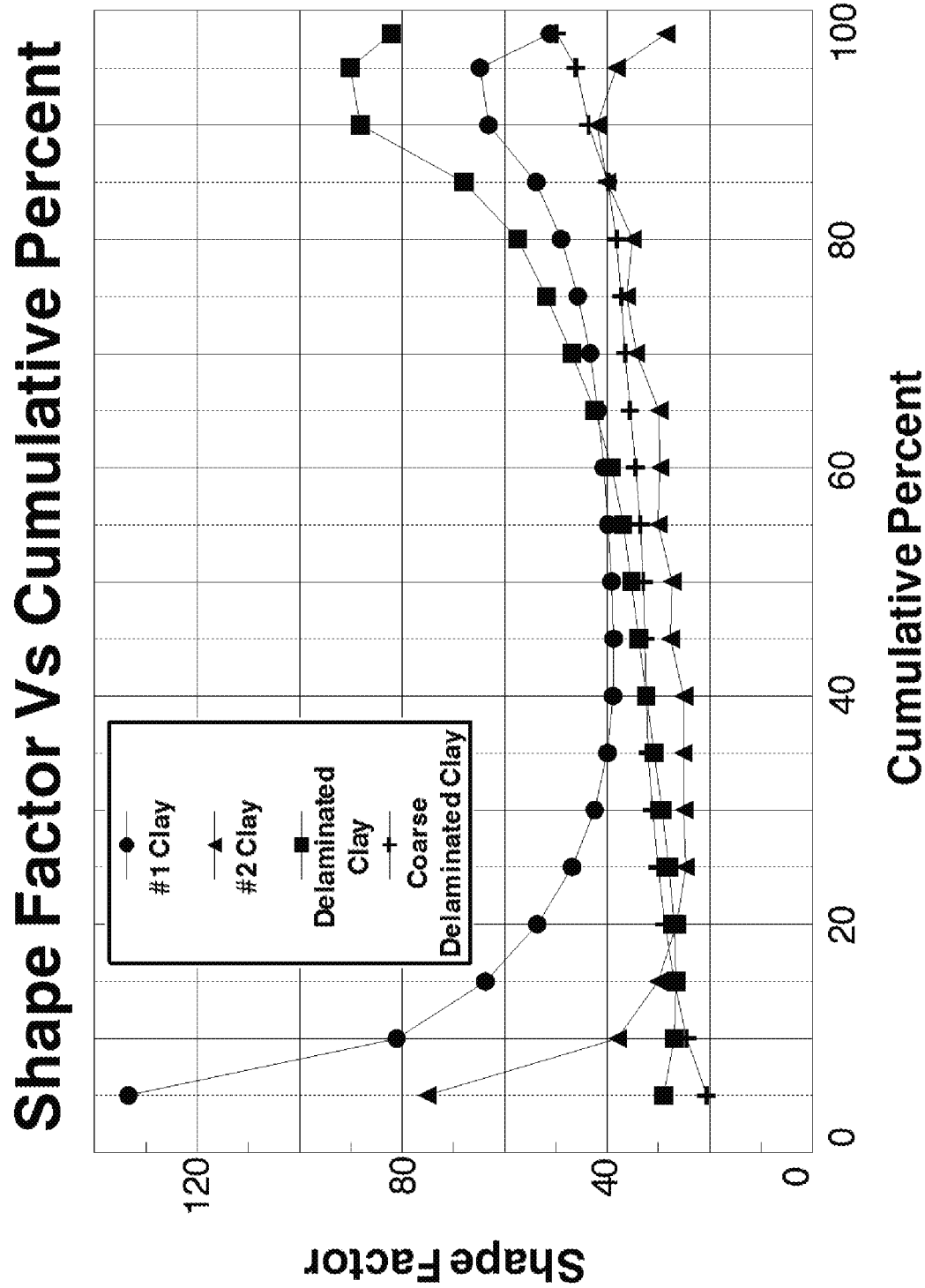
FIG. 14 is a graph for the modified clays, showing shape factor vs. cumulative mass percent.

Because the two methods above for measuring shape factor give differing values, a third method was used here that represents an average over the entire size distribution. By taking the particle size values from the cumulative size distributions at increments of 5%, shape factor distributions were calculated that correspond to the size distributions. To further explore the shape factor across a range of particle diameters, the shape factor was calculated from the Sedigraph and Digisizer diameter measurements at 5% increments across the cumulative particle size distributions. This produced a distribution of shape factors for the entire spectrum of particle size. Data for each of the four modified clays is shown in Tables 2-5. These distributions are shown graphically in FIG. 14. The graph shows that shape factor is not uniform, but instead varies significantly depending on particle size. Because of this, we choose to characterize each pigment by its average shape factor. We calculate this as the arithmetic average of the shape factor values is Tables 1-4. The average shape factors for the modified clays ranged from 33.5 for the coarse delaminated clay to 53.7 for the #1 clay, so all are well below the value of 70 which is the lower threshold of hyperplaty clays.

The novel modified clays are thus seen to have shape factors less than 60, sediment void volumes generally greater than about 48, and percent fines below 1 micron of about 30% or less. The modified clays may provide beneficial effects alone or in mixtures with other clays. The modified clays may be useful in paper coatings, particularly in base coatings; in paints, and in other industrial materials.

The fines content of the modified clay may be relatively low. In one expression, at most about 30 percent by weight of the clay particles may have a particle size less than 1 micrometer as measured by Sedigraph. In another expression, at most about 25 percent by weight of the clay particles may have a particle size less than 1 micrometer as measured by Sedigraph. In another expression, at most about 20 percent by weight of the clay particles may have a particle size less than 1 micrometer as measured by Sedigraph.

The sediment void volume of the modified clays may be relatively high. Sediment void volumes may generally range from about 48 to 60%; or from about 50 to 60%, or from about 52 to 60%, or from about 55 to 60%.

The average shape factor of the modified clays will be less than 60.

Pigments other than clay may be modified in a similar way. Examples of other pigments include, but are not limited to, precipitated calcium carbonate, ground calcium carbonate, and talc.

The modified clays described above, and the standard clays from which they were made, were slip-coated onto various substrates including solid bleached sulfate (SBS), solid unbleached sulfate (SUS), and recycled paperboard. Parker PrintSurf smoothness and Sheffield smoothness were then measured on the coated boards.

A series of basecoat formulations were applied to three different paperboard substrates. The substrates were 11 pt, 38 lb/1000 ft$^2$ solid bleached sulfate (SBS); 18 pt, 59 lb/1000 ft$^2$ solid unbleached sulfate (SUS); and 18 pt, 71 lb/1000 ft$^2$ recycled paperboard. Coatings were formulated using 60 parts clay, 40 parts HYDROCARB® 60 (a coarse ground calcium carbonate), and 20 parts ACRONAL® S504 (a styrene acrylic latex) as binder. Each coating was applied to a 1 ft-wide web of each substrate at 1000 fpm using a bent blade coater. A series of coat weights were obtained by altering the pressure of the blade. While in normal usage, these basecoats would have a second coating applied over them, this experiment compared the smoothness of the basecoat-only coated paperboard. The Parker PrintSurf smoothness and Sheffield Smoothness were measured using the standard techniques. Results are shown on FIGS. 15-20 and will be described below.

Figure 21:
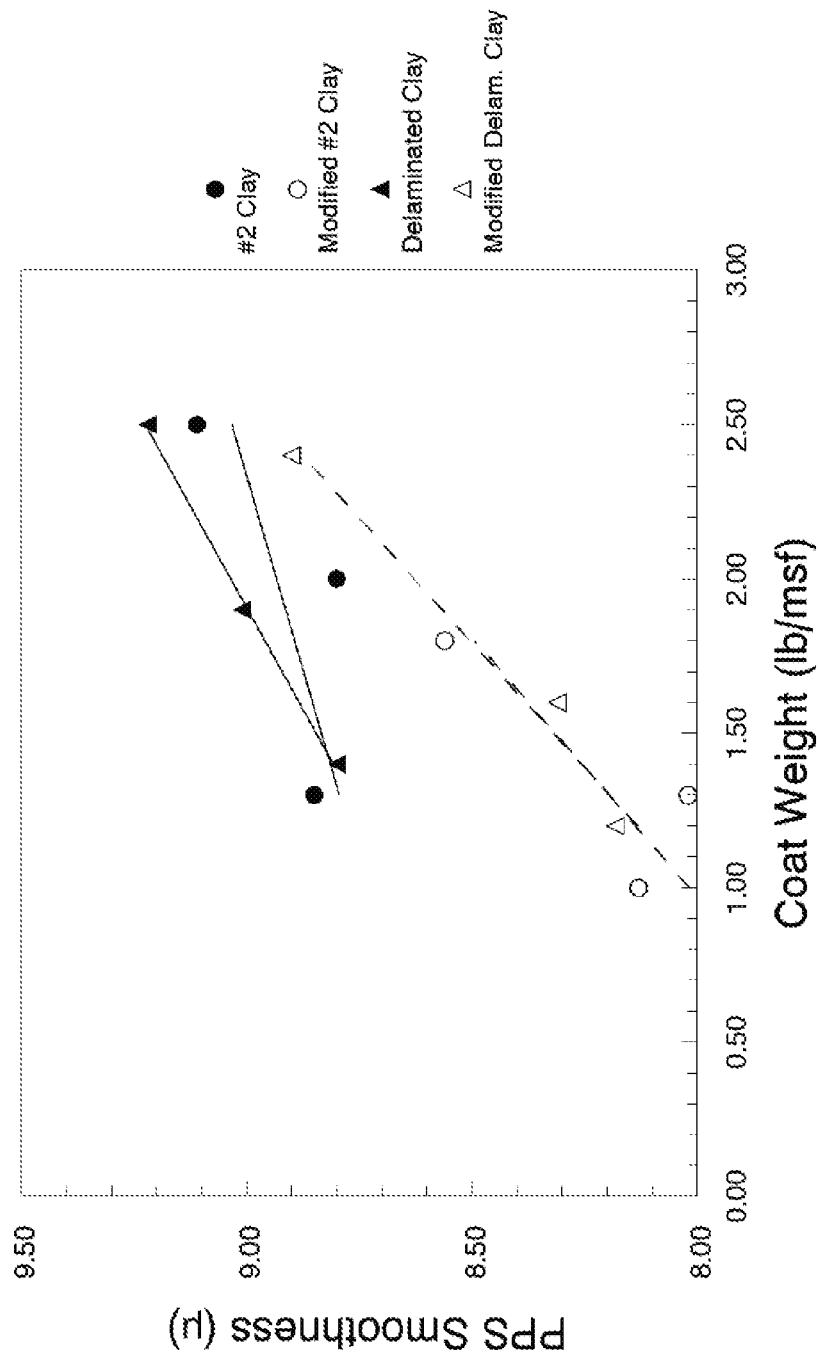
FIG. 21 is a graph of PPS smoothness vs. low coat weight of the modified clays applied to solid bleached sulfate (SBS) paperboard using a film metering size press.

In another experiment, a series of size press formulations were applied to an 11 pt, 38 lb/1000 ft$^2$ unsized solid bleached sulfate (SBS) substrate at 400 fpm using a film-metering size press. Formulations were made with 100 parts clay and 25 parts Ethylex™ 2015 (an ethylated starch) as binder. Modified and unmodified Kaobrite™ and Astra-plate™ were compared. A range of applied weights were obtained. The smoothness results are shown in FIG. 21.

In another experiment, two basecoats were applied to a 14 pt, 140 lb/3000 ft$^2$ solid bleached sulfate (SBS) substrate.

The basecoats were made using 50 parts of either a modified or unmodified delaminated clay (Hydraprint from Kamin), 50 parts coarse ground calcium carbonate (Hydrocarb 60 from Omya), and 20 parts styrene acrylic latex (Acronal S504 from BASF) as binder. Each coating was applied to a 1 ft-wide web at 1000 fpm using a bent blade coater. This web was then passed through the coater again at 400 fpm to apply a top coating, also using a bent blade. The top coating contained 30 parts #1 clay, Kaofine from Thiele, and 70 parts fine ground calcium carbonate, Hydrocarb 90 from Omya, with 12 parts styrene acrylic latex (Acronal S504 from BASF) as binder.

Figure 22:
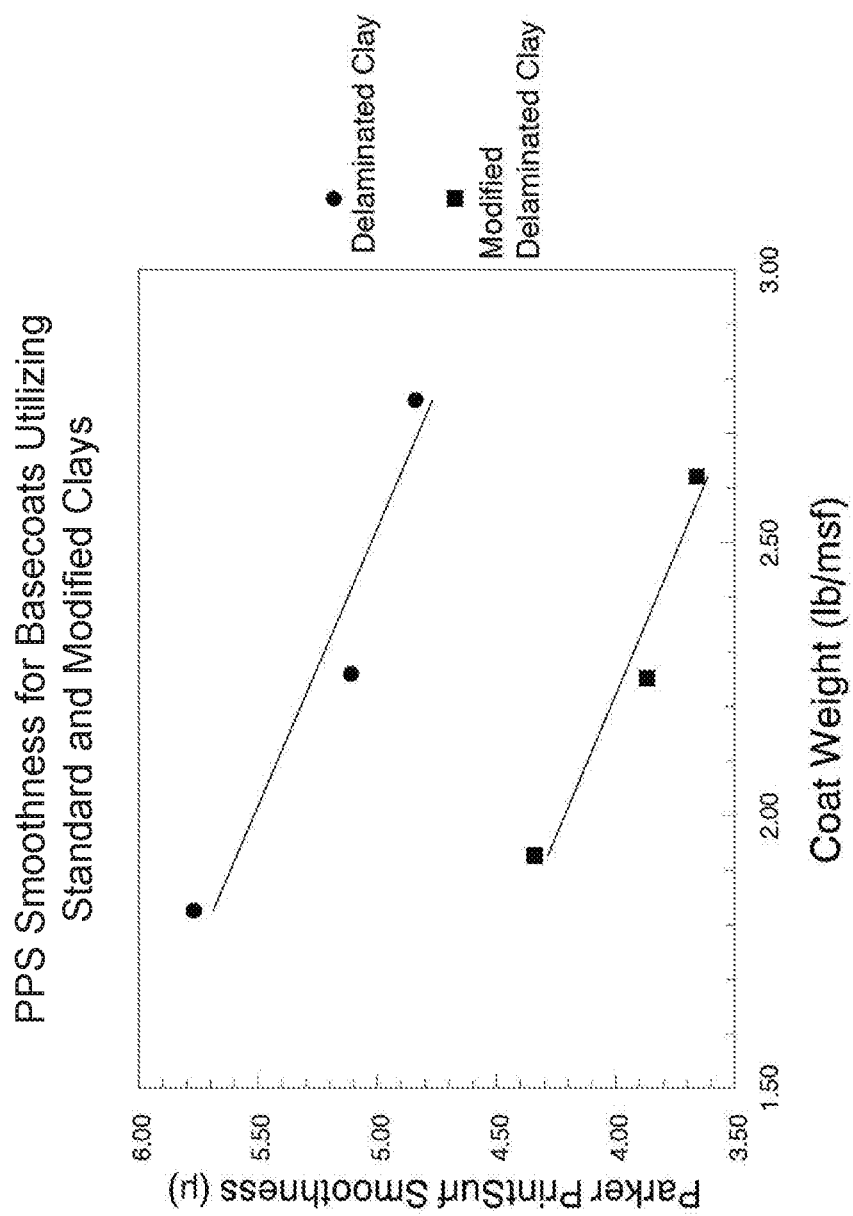
FIG. 22 is a graph of Sheffield smoothness vs. low coat weight of applied basecoats comparing modified clays to unmodified clays.
Figure 23:
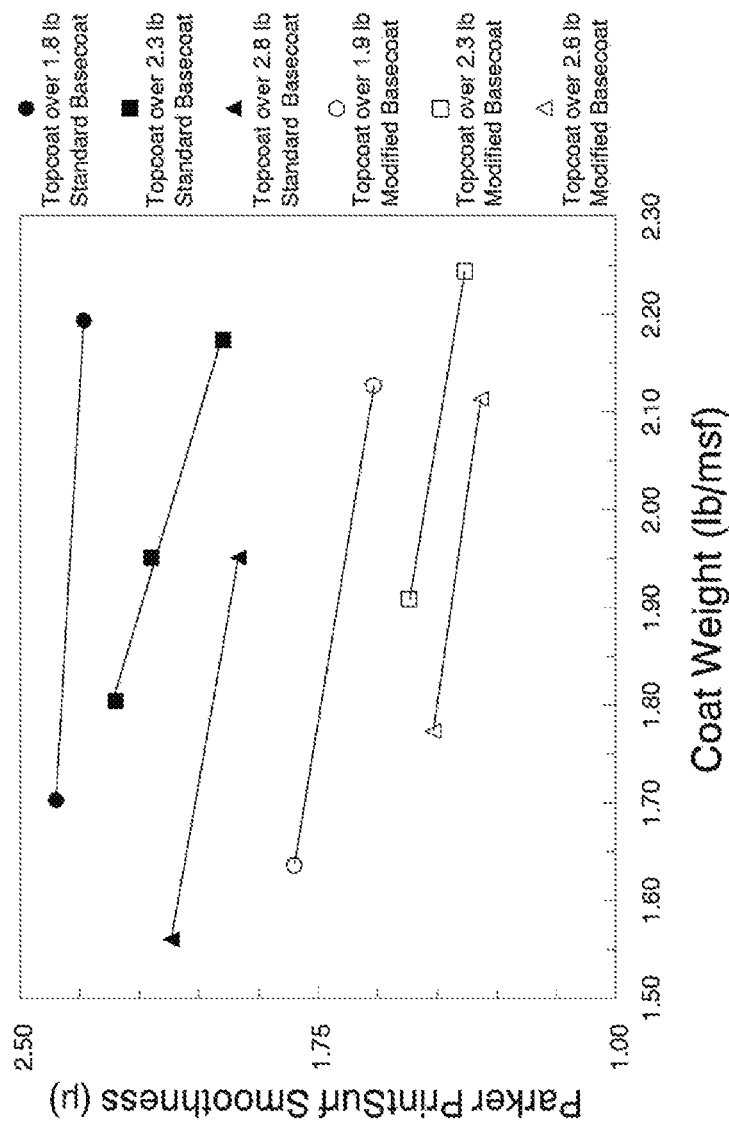
FIG. 23 is a graph of Sheffield smoothness vs. low coat weight of topcoats applied over the basecoats of FIG. 22, comparing modified clays to unmodified clays.

Basecoated and topcoated smoothness data is shown in Tables 6 and 7. FIG. 22 shows the PPS smoothness for basecoated board. The modified delaminated clay gave a 20-25% decrease in roughness. FIG. 23 shows the smoothness results when a series of topcoat weights were applied to each of the basecoat weights. It is clear that the benefits of the modified clay in the basecoat are still present after topcoating. FIG. 24 shows the same data as FIG. 23 except only the topcoat values regressed to a topcoat weight of 2.0 are used. This looks very similar to the basecoated results in FIG. 22, and shows a decrease in roughness of 25-30%.

TABLE 6

Basecoat PPS values for modified and unmodified coarse delaminated clay

| Basecoat Weight | Description | PPS | Std. dev. |
| --- | --- | --- | --- |
| 1.8 | Delaminated | 5.77 | 0.15 |
| 2.3 | Clay | 5.11 | 0.19 |
| 2.8 |  | 4.84 | 0.15 |
| 1.9 | Modified | 4.34 | 0.16 |
| 2.3 | Delaminated | 3.87 | 0.17 |
| 2.6 | Clay | 3.66 | 0.21 |

TABLE 7

Topcoat PPS values for modified and unmodified coarse delaminated clay

|  | Basecoat Weight | Topcoat Weight | Uncalendered PPS | Std. dev. |
| --- | --- | --- | --- | --- |
| Delaminated | 1.8 | 1.7 | 2.41 | 0.14 |
| Clay | 1.8 | 2.2 | 2.34 | 0.10 |
|  | 2.3 | 1.8 | 2.26 | 0.08 |
|  | 2.3 | 2.0 | 2.17 | 0.18 |
|  | 2.3 | 2.2 | 1.99 | 0.08 |
|  | 2.8 | 1.6 | 2.12 | 0.07 |
|  | 2.8 | 2.0 | 1.95 | 0.10 |
| Modified | 1.9 | 1.6 | 1.81 | 0.22 |
| Delaminated | 1.9 | 2.1 | 1.61 | 0.10 |
| Clay | 2.3 | 1.9 | 1.52 | 0.12 |
|  | 2.3 | 2.2 | 1.38 | 0.09 |
|  | 2.6 | 1.8 | 1.46 | 0.10 |
|  | 2.6 | 2.1 | 1.34 | 0.06 |

PrintSurf Smoothness

Figure 15:
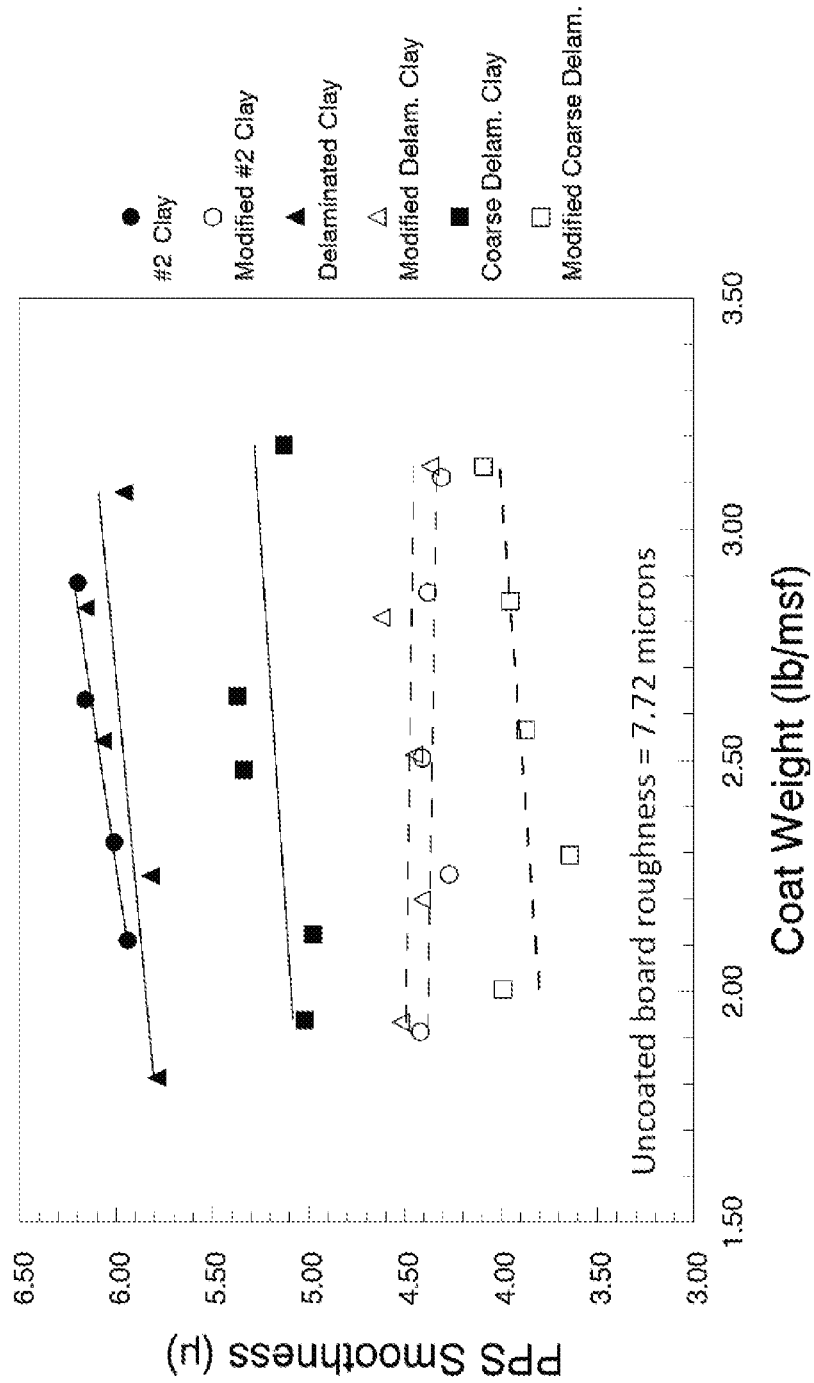
FIG. 15 is a graph of Parker PrintSurf smoothness (PPS) vs. low coat weight of the modified clays applied to solid bleached sulfate (SBS) paperboard.

Uncoated SBS paperboard with an initial PPS of 7.72 microns was coated by drawdown applications of the various clays at from 2 to 3 lb/3000 ft$^2$. FIG. 15 shows the Parker PrintSurf smoothness of the resulting coated paperboard. Coating with #2 clay (round data points) gave a PPS around 6.1, while the modified #2 clay gave significantly better PPS at around 4.4. Coating with delaminated clay (triangles) gave a PPS around 5.8, while the modified delaminated clay gave significantly better PPS of around 4.5. Coating with coarse delaminated clay (squares) gave a PPS around 5.3, while the modified coarse delaminated clay gave significantly better PPS of around 3.9. For all the clays, varying the coat weights over the narrow 2-3 lb range had little impact on the resulting PPS.

Figure 16:
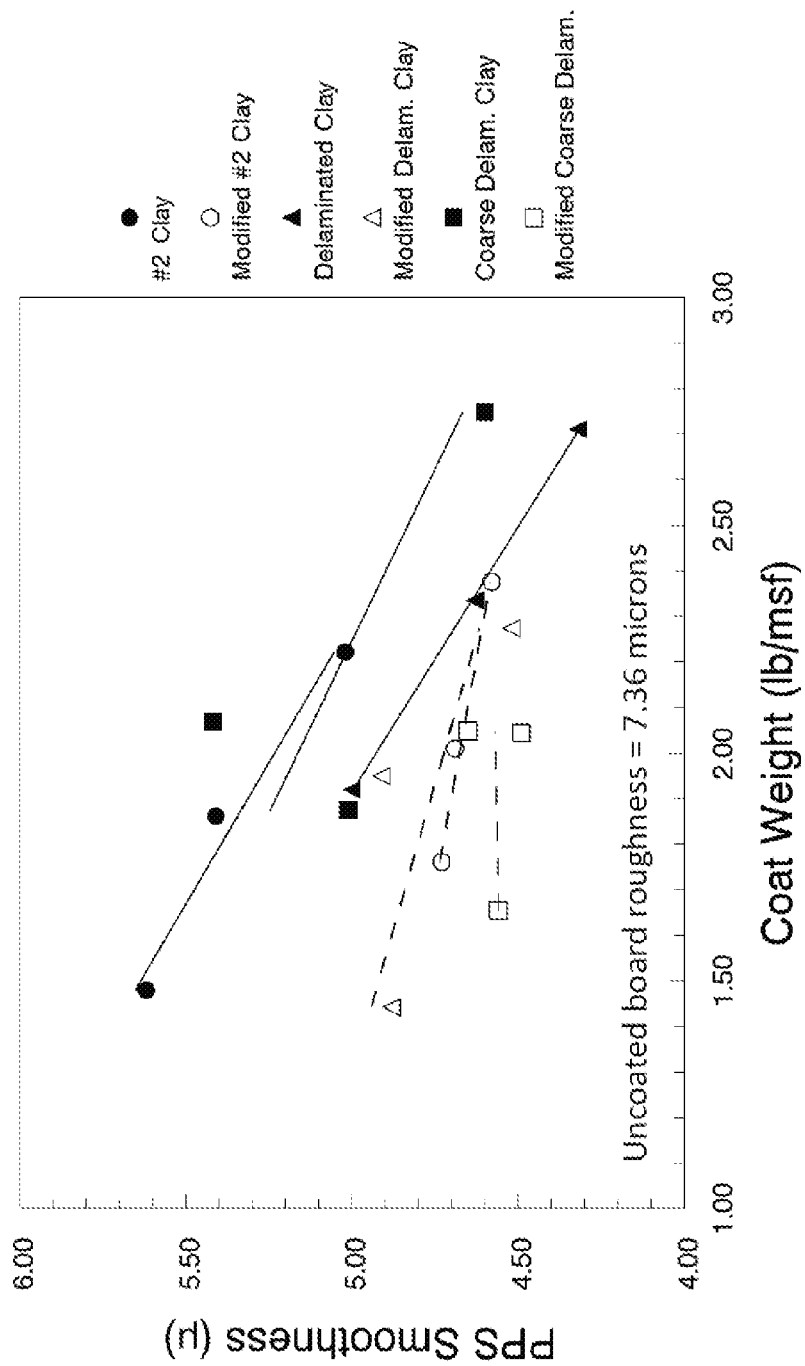
FIG. 16 is a graph of PPS smoothness vs. low coat weight of the modified clays applied to recycled paperboard.

Uncoated recycled paperboard with an initial PPS of 7.36 microns was coated by drawdown applications of the various clays at from 1.5 to 2.5 lb/3000 ft$^2$. FIG. 16 shows the Parker PrintSurf smoothness of the resulting coated recycled paperboard. Coating with #2 clay (round data points) gave a PPS of 5-5.5, while the modified #2 clay gave significantly better PPS at around 4.7. Coating with delaminated clay (triangles) gave a PPS of 4.3-5, while the modified delaminated clay gave slightly better PPS of around 4.5-4.9. Coating with coarse delaminated clay (squares) gave PPS from 4.7-5.4, while the modified coarse delaminated clay gave PPS of around 4/6. Generally, increasing the coat weights over the narrow 2-3 lb range improved PPS somewhat.

Figure 17:
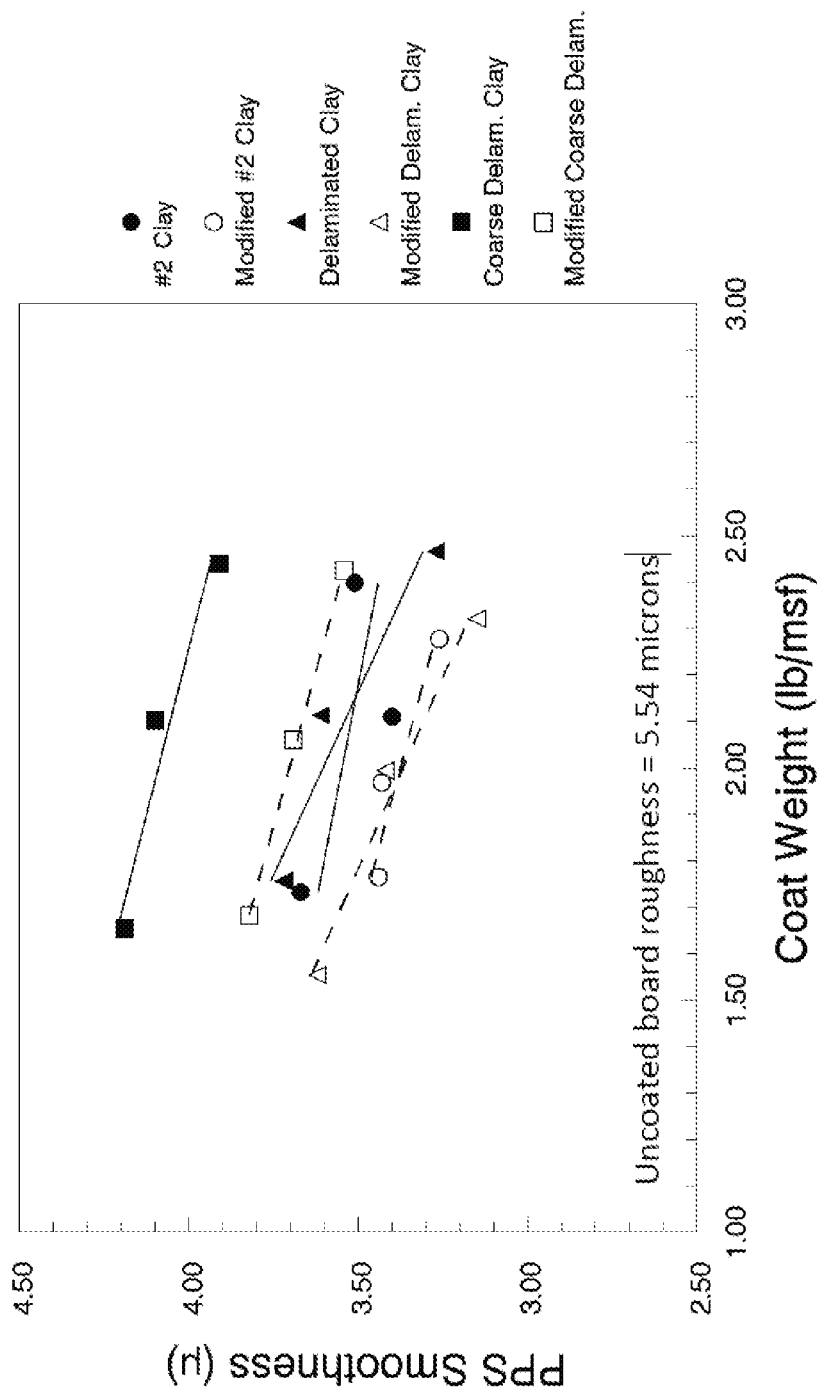
FIG. 17 is a graph of PPS smoothness vs. low coat weight of the modified clays applied to solid unbleached sulfate (SUS) paperboard.

Uncoated solid unbleached sulfate (SUS) paperboard with an initial PPS of 5.54 microns was coated by drawdown applications of the various clays at from 1.5 to 2.5 lb/3000 ft$^2$. FIG. 17 shows the Parker PrintSurf smoothness of the resulting coated SUS paperboard. Coating with #2 clay (round data points) gave a PPS of 3.4-3.7; the modified #2 clay gave PPS about 0.3 better. Coating with delaminated clay (triangles) gave a PPS of 3.3-3.7, the modified delaminated clay gave PPS about 0.3 better. Coating with coarse delaminated clay (squares) gave PPS from 3.9-4.2, while the modified coarse delaminated clay gave PPS of about 0.4 better. Generally, increasing the coat weights over the narrow 1.5-2.5 lb range improved PPS a little.

Sheffield Smoothness

Figure 18:
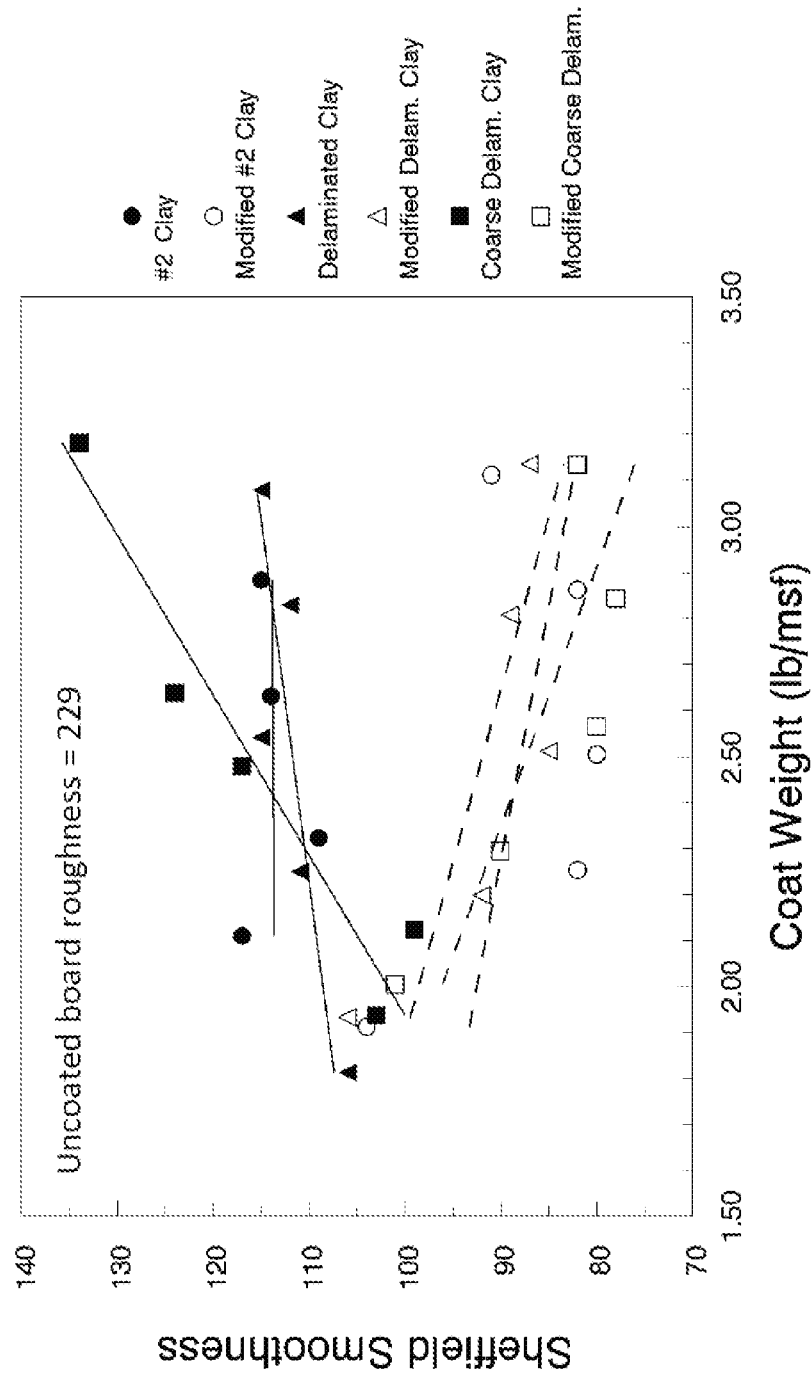
FIG. 18 is a graph of Sheffield smoothness vs. low coat weight of the modified clays applied to solid bleached sulfate (SBS) paperboard.

Uncoated SBS paperboard with an initial Sheffield Smoothness (SR) of 229 was coated by drawdown applications of the various clays at from 2 to 3 lb/3000 ft$^2$. FIG. 18 shows the Sheffield smoothness of the resulting coated paperboard. Coating with #2 clay (round data points) gave a SR around 110, while the modified #2 clay gave better SR at around 90. Coating with delaminated clay (triangles) gave a SR around 110, while the modified delaminated clay gave better SR of around 90. Coating with coarse delaminated clay (squares) gave a SR from 100-130, while the modified coarse delaminated clay gave better SR of around 80-100. For all the clays, as the coat weights were increased over the narrow 2-3 lb range, Sheffield tended to increase (worsen) for the standard clays, and tended to decrease (improve) for the modified versions.

Figure 19:
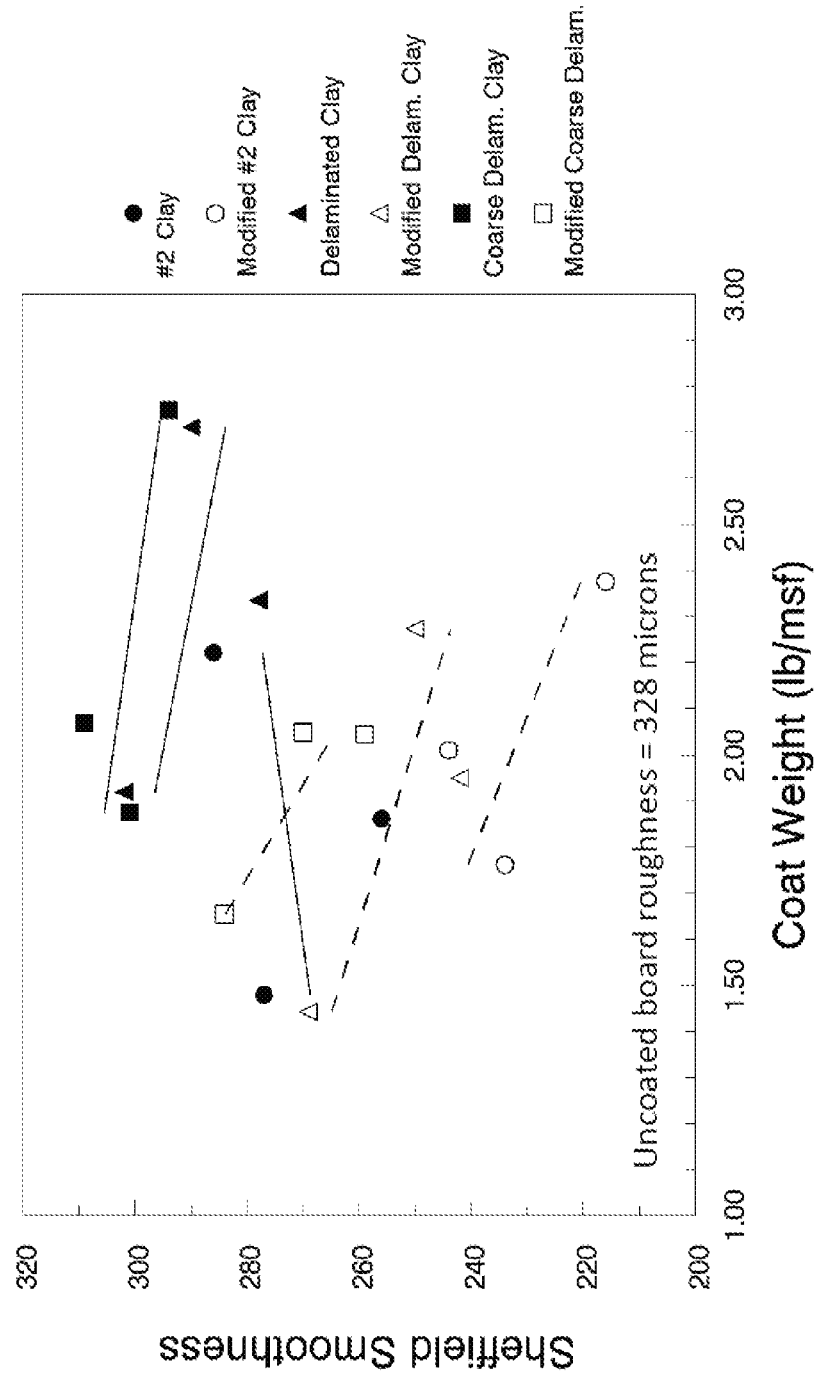
FIG. 19 is a graph of Sheffield smoothness vs. low coat weight of the modified clays applied to recycled paperboard.

Uncoated recycled paperboard with an initial SR of 328 was coated by drawdown applications of the various clays at from 1.5 to 2.5 lb/3000 ft$^2$. FIG. 19 shows the Sheffield smoothness of the resulting coated recycled paperboard. Coating with #2 clay (round data points) gave a SR of 260-290, while the modified #2 clay gave better SR at around 220-240. Coating with delaminated clay (triangles) gave a SR of 280-300, while the modified delaminated clay gave better SR of around 250. Coating with coarse delaminated clay (squares) gave SR around 300, while the modified coarse delaminated clay gave SR of around 270-280. Usually, increasing the coat weights over the narrow 2-3 lb range improved SR somewhat.

Figure 20:
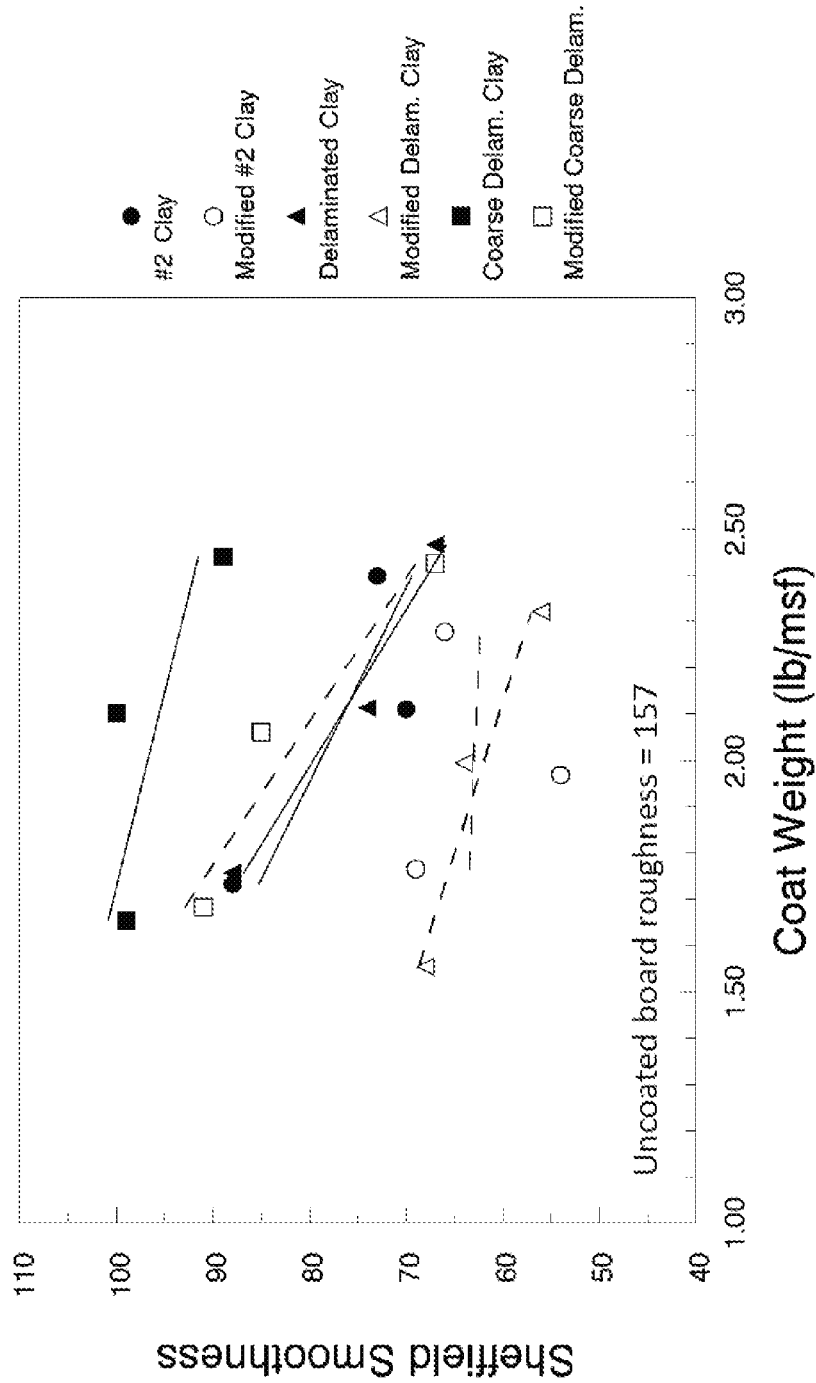
FIG. 20 is a graph of Sheffield smoothness vs. low coat weight of the modified clays applied to solid unbleached sulfate (SUS) paperboard.

Uncoated solid unbleached sulfate (SUS) paperboard with an initial SR of 157 was coated by drawdown applications of the various clays at from 1.5 to 2.5 lb/3000 ft$^2$. FIG. 20 shows the Sheffield smoothness of the resulting coated SUS paperboard. Coating with #2 clay (round data points) gave a SR of 70-90; the modified #2 clay gave SR about 20 units better. Coating with delaminated clay (triangles) gave a SR of 70-90, the modified delaminated clay gave SR about 15 units better. Coating with coarse delaminated clay (squares) gave SR from 90-100, while the modified coarse delaminated clay gave SR of about 10-20 better. Generally, increasing the coat weights over the narrow 1.5-2.5 lb range improved SR a little.

Besides the drawdown tests, a few samples were treated by applying the clays in a size press. Unsized solid bleached sulfate (SBS) paperboard was coated by size press application of the various clays at from 1 to 2.5 lb/3000 ft². FIG. 21 shows the Parker PrintSurf smoothness (PPS) of the resulting sized SBS paperboard. Coating with the standard #2 clay (solid circles) or standard delaminated clay (solid triangles) gave PPS values of 8.8 to 9.2 microns; the modified clays gave PPS values from 8 to 8.8. Generally, increasing the coat weights over the narrow 1.5-2.5 lb range improved PPS a little.

Thus, the coating tests shows that the modified clays almost universally outperformed the standard clays, that is, provided smoother paperboard at a given coat weight.

Although various embodiments have been shown and described, modifications may occur to those skilled in the art upon reading the specification. The present patent application includes such modifications and is limited only by the scope of the claims.

What is claimed is:

1. A coated paperboard comprising:
a paperboard substrate having a first surface; and
a coating composition applied to the first surface of the paperboard substrate to form a first coating on the first surface, the coating composition comprising:
  a binder; and
  a pigment in admixture with the binder, wherein the pigment comprises an amount of clay particles, wherein:
    the amount of clay particles has an average shape factor below 60, as determined by the method described herein,
    the amount of clay particles has a sediment void volume greater than 48%, as determined by the method described herein, and
    less than 30% by mass of the amount of clay particles are less than 1 micron in size, as measured by Sedigraph.

2. The coated paperboard of claim 1 wherein the amount of clay particles has a sediment void volume greater than 50%.

3. The coated paperboard of claim 1 wherein the amount of clay particles has a sediment void volume greater than 52%.

4. The coated paperboard of claim 1 wherein the amount of clay particles has a sediment void volume greater than 55%.

5. The coated paperboard of claim 1 wherein less than 25% by mass of the amount of clay particles are less than 1 micron in size as measured by Sedigraph.

6. The coated paperboard of claim 1 wherein less than 20% by mass of the amount of clay particles are less than 1 micron in size as measured by Sedigraph.

7. The coated paperboard of claim 1 wherein less than 18% by mass of the amount of clay particles are less than 1 micron in size as measured by Sedigraph.

8. The coated paperboard of claim 1 wherein the pigment further comprises coarse ground calcium carbonate.

9. The coated paperboard of claim 1 wherein the binder comprises styrene acrylic latex.

10. The coated paperboard of claim 1 wherein the coating composition comprises approximately 50 to 60 parts clay particles and approximately 40 to 50 parts coarse ground calcium carbonate based on the total amount of clay particles and coarse ground calcium carbonate.

11. The coated paperboard of claim 10 wherein the coating composition comprises approximately 20 parts binder.

12. The coated paperboard of claim 1 wherein the binder comprises at least one of styrene acrylic latex and ethylated starch.

13. The coated paperboard of claim 1 wherein the first coating has a coat weight of about 1.5 to about 3 lb/3000 ft².

14. The coated paperboard of claim 1 further comprising a second coating applied over the first coating.

15. The coated paperboard of claim 14 wherein the second coating comprises clay, coarse ground calcium carbonate and a binder.

16. The coated paperboard of claim 14 wherein the second coating has a coat weight of about 1.6 to about 2.2 lb/3000 ft².

17. The coated paperboard of claim 1 wherein the paperboard substrate is selected from solid bleached sulfate, solid unbleached sulfate, and recycled paperboard.

18. A method for forming a coated paperboard from a paperboard substrate having a first surface, the method comprising:
applying a coating composition to the first surface of the paperboard substrate, the coating composition comprising
  a binder; and
  a pigment in admixture with the binder, wherein the pigment comprises an amount of clay particles, wherein:
    the amount of clay particles has an average shape factor below 60, as determined by the method described herein,
    the amount of clay particles has a sediment void volume greater than 48%, as determined by the method described herein, and
    less than 30% by mass of the amount of clay particles are less than 1 micron in size, as measured by Sedigraph.

19. The method of claim 18 wherein the amount of clay particles has a sediment void volume greater than 50%.

20. The method of claim 18 wherein less than 18% by mass of the amount of clay particles are less than 1 micron in size, as measured by Sedigraph.

* * * * *